United States Patent
De Foy et al.

(10) Patent No.: US 12,501,387 B2
(45) Date of Patent: Dec. 16, 2025

(54) USER EQUIPMENT/WIRELESS TRANSMIT/RECEIVE UNIT-PROVIDED DATA NETWORKS ON WTRUS

(71) Applicant: InterDigital Patent Holdings, Inc., Wilmington, DE (US)

(72) Inventors: Xavier De Foy, Kirkland (CA); Ulises Olvera-Hernandez, Saint-Lazare (CA); Saad Ahmad, Montreal (CA); Shamim Rahman, Cote St. Luc (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 419 days.

(21) Appl. No.: 18/033,257

(22) PCT Filed: Oct. 22, 2021

(86) PCT No.: PCT/US2021/056209
§ 371 (c)(1),
(2) Date: Apr. 21, 2023

(87) PCT Pub. No.: WO2022/087381
PCT Pub. Date: Apr. 28, 2022

(65) Prior Publication Data
US 2023/0413212 A1    Dec. 21, 2023

Related U.S. Application Data

(60) Provisional application No. 63/104,698, filed on Oct. 23, 2020.

(51) Int. Cl.
*H04W 60/04* (2009.01)
*H04W 12/06* (2021.01)

(52) U.S. Cl.
CPC ........... *H04W 60/04* (2013.01); *H04W 12/06* (2013.01)

(58) Field of Classification Search
CPC ....... H04W 60/04; H04W 12/06; H04W 4/40; H04W 4/46; H04W 8/18; H04W 8/245;
(Continued)

(56) References Cited

U.S. PATENT DOCUMENTS 11,076,318 B2*   7/2021  Shan ................... H04L 65/1104
2019/0053187 A1*  2/2019  Tiwari .................. H04W 76/12
(Continued)

FOREIGN PATENT DOCUMENTS

WO    WO-2019197872 A1 * 10/2019 ............. H04L 69/40
WO    2020/146211 A1    7/2020

OTHER PUBLICATIONS

3rd Generation Partnership Project (3GPP), S2-2004073, KI#4 and 8, New Solution: Authorization for 5G ProSe UE-to-UE Relay Service, SA WG2 Meeting #139E, Intel, Electronic, Jun. 1-12, 2020, 4 pages.
3rd Generation Partnership Project (3GPP) TR 23.752 V17.0.0, Technical Specification Group Services and System Aspects, Study on system enhancement for Proximity based Services (ProSe) in the 5G System (5GS) (Release 17), Mar. 2021, pp. 1-183.
(Continued)

*Primary Examiner* — Brandon J Miller
(74) *Attorney, Agent, or Firm* — Condo Roccia Koptiw LLP

(57) ABSTRACT

Systems and methods are described herein for a wireless transmit/receive unit (WTRU) activating and/or deactivating user equipment (UE)/WTRU-provided data network (UPDN). The WTRU may advertise availability of UPDN a (e.g., 5G) network. A UPDN software application may be transferred onto and/or installed on a WTRU to implement a UPDN. A WTRU may be authenticated and/or authorized to a host for a given UPDN instance, UPDN installation and/or update may be configured if an authentication fails because a UPDN software application is not up-to-date and/or not installed. A WTRU may provide information to a service provider for installing UPDN and/or update UPDN software. Control connectivity and/or path selection for
(Continued)

UPDN may be configured by one or more WTRU route selection policy (URSP) rules. A UPDN profile and/or UPDN subscription profile may be configured in a system (e.g., 5G system (5GS)). UPDN may be provisioned in a (e.g., 5G) network.

16 Claims, 23 Drawing Sheets

(58) Field of Classification Search
CPC ..... H04W 12/08; H04W 48/18; H04W 92/18; H04W 4/70; H04L 63/0892; H04L 67/1091
See application file for complete search history.

(56) References Cited

U.S. PATENT DOCUMENTS

| | | | |
|---|---|---|---|
| 2019/0306754 A1 | 10/2019 | Shan et al. | |
| 2019/0313469 A1* | 10/2019 | Karampatsis | ......... H04W 48/04 |
| 2020/0337093 A1* | 10/2020 | Kim | ...................... H04W 64/00 |

OTHER PUBLICATIONS

3rd Generation Partnership Project (3GPP) TS 23.558 V18.2.0, Technical Specification Group Services and System Aspects, Architecture for enabling Edge Applications, (Release 18), Mar. 2023, pp. 1-237.

3rd Generation Partnership Project (3GPP) TS 29.244 V18.1.0, Technical Specification Group Core Network and Terminals, Interface between the Control Plane and the User Plane Nodes, Stage 3 (Release 18), Mar. 2023, pp. 1-389.

* cited by examiner

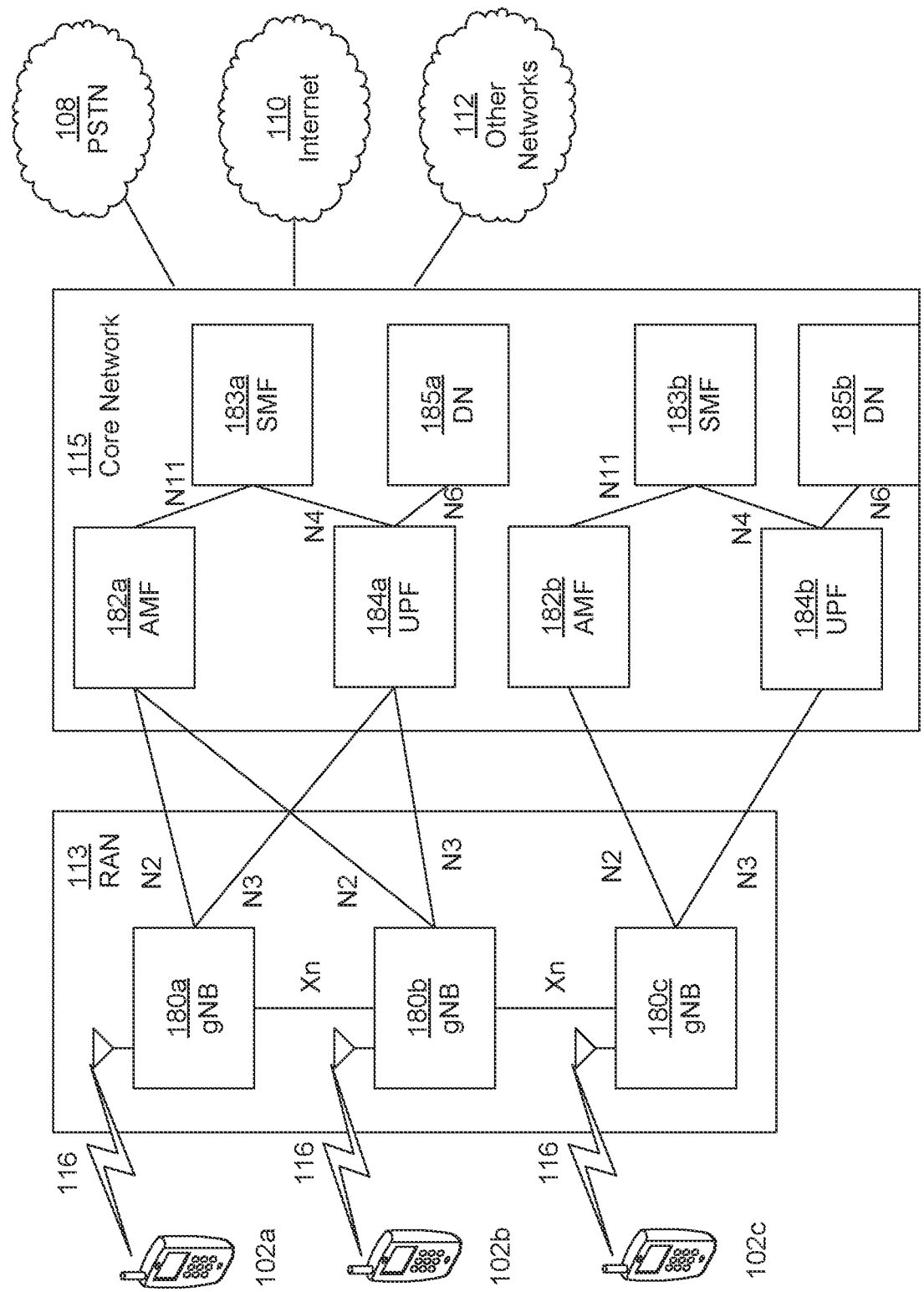

| Example WTRU Route Selection Policy Rule |
|---|
| Rule Precedence |
| Traffic descriptor component including:<br>• Application descriptors<br>• IP descriptors<br>• Domain descriptors<br>• Non-IP descriptors<br>• DNN<br>• UPDN types (e.g., local UPDN allowed/disallowed/needed, D2D UPDN allowed/disallowed/needed, remote DN allowed/disallowed/needed); this may be matched against UPDN information provided by an application. For example, configuration information that states that a client application may be allowed to access local UPDN, D2D UPDN, and/or a remote DN.<br>• Connection Capabilities |
| List of Route Selection Descriptors including one or more:<br>• Route Selection Descriptor including:<br>   o Route Selection Descriptor Precedence<br>   o One or more Route selection components including at least one of:<br>      ▪ SSC Mode Selection<br>      ▪ Network Slice Selection<br>      ▪ DNN Selection<br>      ▪ UPDN type:<br>           • Needed (e.g., at least one of: Local UPDN, Remote DN, D2D UPDN, WTRU ID, and/or WTRU group ID)<br>           • Allowed (e.g., one or more of: Local UPDN, Remote DN, D2D UPDN, WTRU ID, and/or WTRU group ID)<br>      ▪ PDU Session Type Selection<br>      ▪ Non-Seamless Offload indication<br>      ▪ Access Type preference<br>   o Route Selection Validation Criteria including<br>      ▪ Time Window<br>      ▪ Location Criteria |

FIG. 9

| UPDN profile |
|---|
| • UPDN ID |
| • DNN |
| • DNAI or DNAI prefix (e.g., in this case DNAI may be generated using: DNAI prefix and WTRU ID) |
| • Allowed list: subscription IDs and/or WTRU group IDs identifying WTRUs allowed to host the UPDN |
| • Required list: subscription IDs and/or WTRU group IDs identifying WTRUs that are required to host this UPDN |
| • Status information: subscription IDs and/or WTRU group IDs identifying "UPDN provider" WTRUs known to host this UPDN, and/or currently hosting an active UPDN instance |
| • UPDN authentication/authorization information for UPDN providers: UPDN auth flag (e.g., indicates auth required for WTRU to host UPDN, e.g., "UPDN providers"), address of DN-AAA server(s), DNN where DN-AAA servers are located (e.g., if different from UPDN DNN). May be used as described in the UPDN authorization and support for UPDN installation/update |
| • WTRU authentication/authorization information for UPDN consumers: WTRU access auth flag (e.g., indicates auth required for WTRU to access UPDN), address of DN-AAA server(s), DNN where DN-AAA servers are located (e.g., if different from UPDN DNN). May be used as described in UPDN PDU Connectivity Support. This field may be a list of "member UDPN consumers", which may be WTRU IDs (e.g., GPSIs) and/or WTRU group IDs, corresponding to WTRUs allowed to access the UPDN |
| • Preference for using local control or in-network SMF (e.g., used in FIG. 17) |
| • Active flag (e.g., used to deactivate a UPDN prior to removing it from the 5G network) |
| • List of URSP rules for backend traffic of a UPDN instance |
| • List of slices (e.g., identified using S-NSSAI) that allowed be used for accessing this UPDN |
| • List of slices (e.g., identified using S-NSSAI) that are not allowed be used for accessing this UPDN |

FIG. 11

| WTRU subscription additional UPDN information fields |
|---|
| • UPDN support flag (e.g., may indicate that UPDNs may be installed/or and activated on a WTRU in the subscription) |
| • For a (e.g., each) supported/installed UPDN, one or more of the following: |
|     ○ DNN |
|     ○ UPDN configuration (e.g., allowed or needed) |
|     ○ UPDN status (e.g., enabled or disabled) |

FIG. 12

UPDN management API exemplary operation 1
Service operation name: UpdnCreate, "Create a (e.g., new) UPDN"
Inputs (needed): DNN. Zero or more of the following: DNAI, lists of subscription IDs and/or group IDs identifying WTRUs allowed to host the UPDN, list of allowed VM image ID/signature/parameters, DNAI selection order, control preference order, list of allowed DN application IDs, start-up behavior, URSP rule parameters for backend UPDN traffic (e.g., DNN, network slice, etc. to use for PDU sessions for backend traffic).
Action: NEF/PCF may create a UPDN profile and/or may store the profile in UDR.
Outputs (needed): operation execution result indication.

UPDN management API exemplary operation 2
Service operation name: UpdnDelete, "Delete an existing UPDN"
Inputs (needed): DNN
Action: NEF/PCF may disable the UPDN profile (e.g., setting valid flag to false) to prevent the UPDN to be activated. If no active UPDN instance exists in a network, NEF/PCF may remove the UPDN profile from UDR.
Outputs (needed): operation execution result indication.

UPDN management API exemplary operation 3
Service operation name: UpdnModify, "Modify an existing UPDN"
Inputs (needed): DNN and one or more of the following: DNAI, lists of subscription IDs and/or group IDs identifying WTRUs allowed to host this UPDN, list of allowed VM image ID/signature/parameters, DNAI selection order, control preference order, list of allowed DN application IDs, default start-up behavior, URSP rule parameters for backend UPDN traffic (e.g., DNN, network slice, etc. to use for PDU sessions for backend traffic).
Action: NEF/PCF may modify the UPDN profile (e.g., stored in UDR) identified by DNN. PCF may update UPDN profiles on or send a notification to, listening WTRUs/AMFs/SMFs.
Outputs (needed): operation execution result indication.

FIG. 14

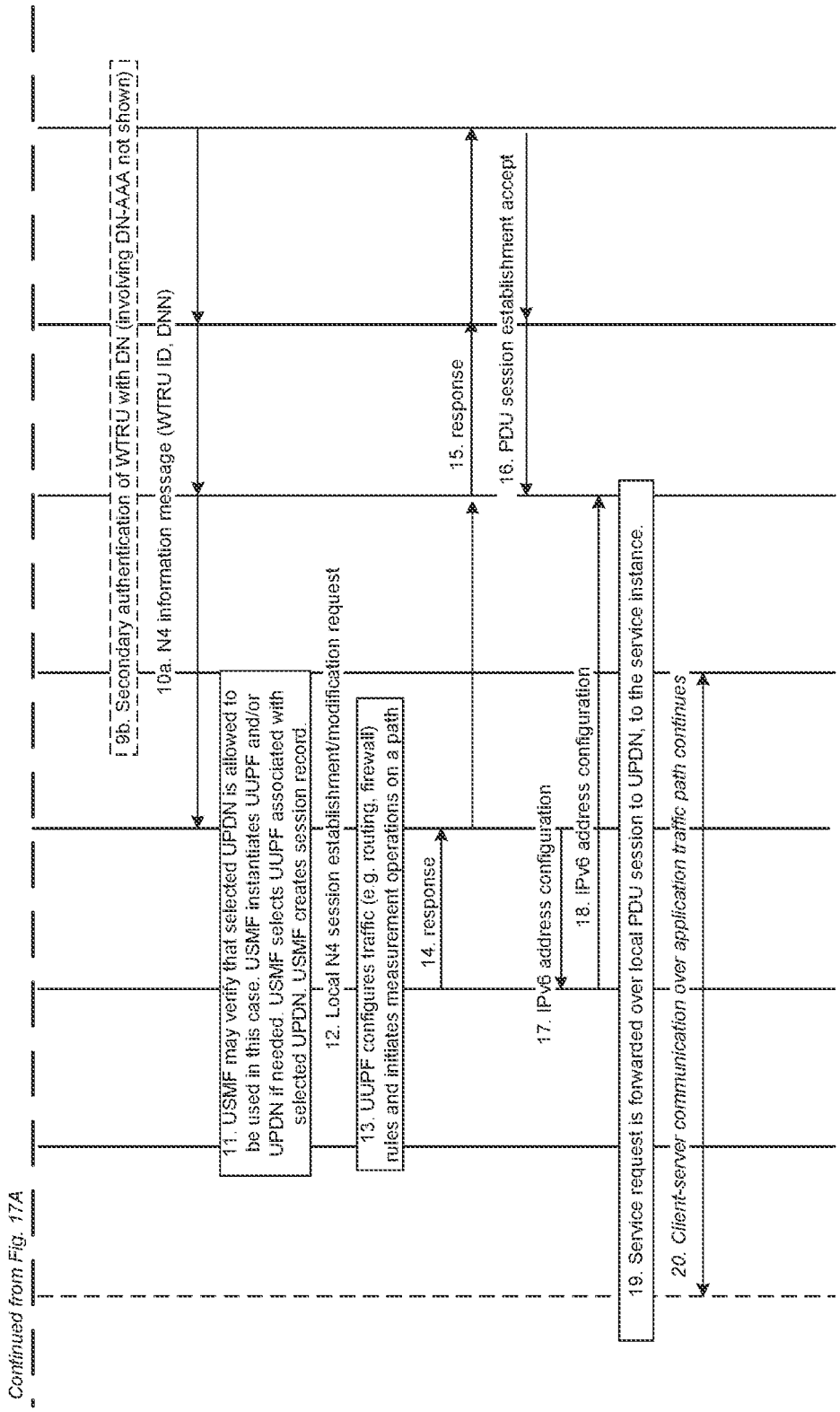

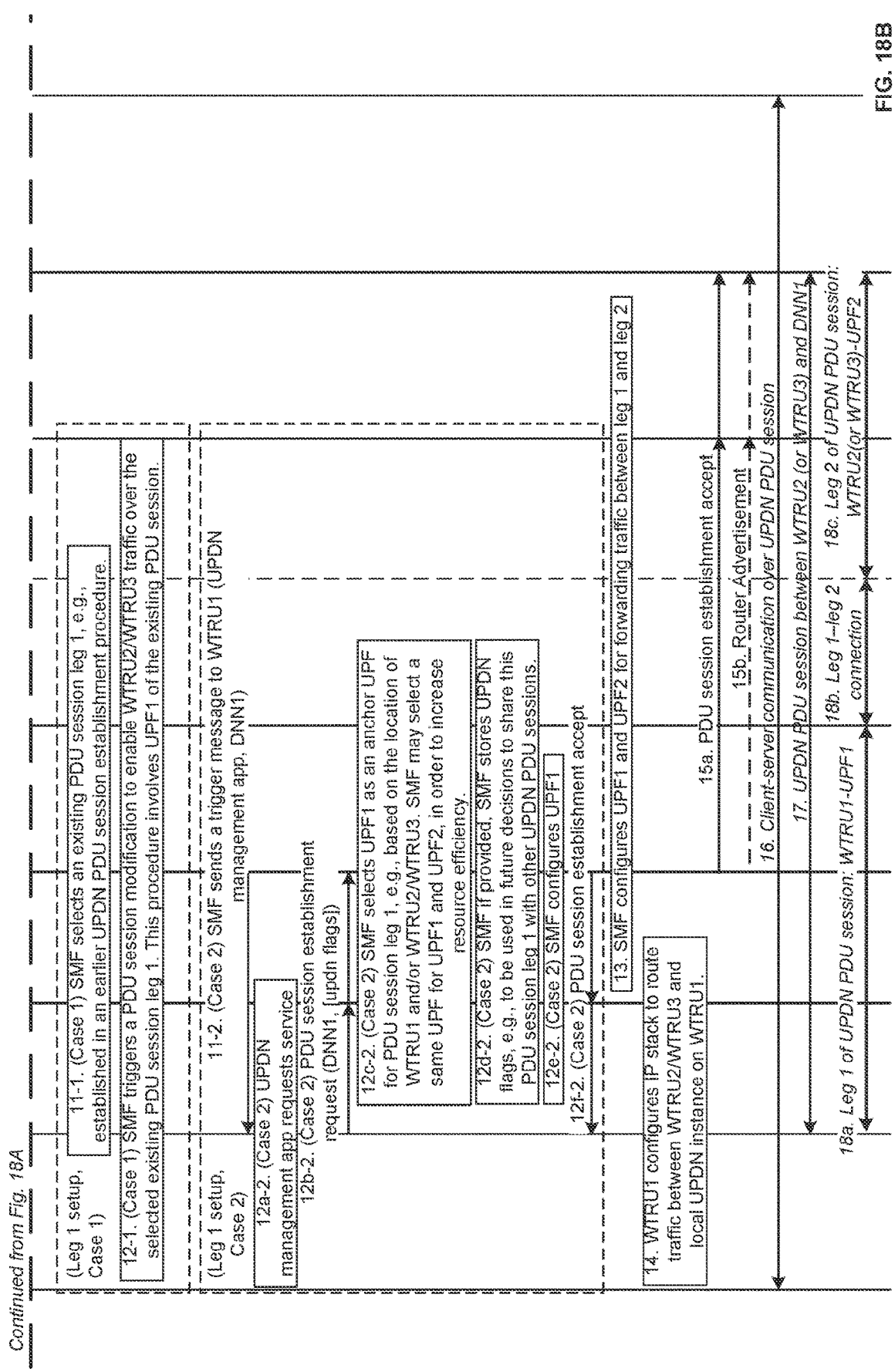

USER EQUIPMENT/WIRELESS TRANSMIT/RECEIVE UNIT-PROVIDED DATA NETWORKS ON WTRUS

CROSS-REFERENCE TO RELATED APPLICATIONS

This application is the National Stage Entry under 35 U.S.C. § 371 of Patent Cooperation Treaty Application No. PCT/US2021/056209, filed Oct. 22, 2021, which claims the benefit of Provisional U.S. Patent Application No. 63/104,698, filed Oct. 23, 2020, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems and methods are described herein for a wireless transmit/receive unit (WTRU) activating and/or deactivating user equipment (UE)/WTRU-provided data network (UPDN). By way of example, WTRU described herein may be or may include a UE. UE-provided data network ay be interchangeably referred to as WTRU-provided data network. If UPDN instance is deployed and running on a WTRU, the WTRU may advertise availability of UPDN a (e.g., 5G) network.

A UPDN software application may be transferred onto and/or installed on a WTRU to implement a UPDN. A WTRU may be authenticated and/or authorized to a host for a given UPDN instance. For example, a WTRU may be authenticated and/or authorized by a service provider (e.g., an owner of data network name (DNN) of the UPDN). UPDN installation and/or update may be configured if an authentication fails because a UPDN software application is not up-to-date and/or not installed. A WTRU may provide information to a service provider (e.g., through a data network-authentication, authorization, accounting (DN-AAA) server) for installing UPDN and/or update UPDN software (e.g., UPDN software ID and/or version).

Control connectivity and/or path selection for UPDN may be configured by one or more WTRU route selection policy (URSP) rules. One or more URSP rules may be used to initiate communication with a UPDN.

A UPDN profile and/or UPDN subscription profile may be configured in a system (e.g., 5G system (5GS)). A UPDN profile may include one or more information elements: a DNN, WTRU IDs or WTRU group IDs identifying WTRUs that are allowed to host an instance of UPDN, DN access identifier (DNAI) or DNAI prefix, and/or a UPDN ID (e.g., a fully qualified domain name (FQDN)) that is used to identify a UPDN. UPDN subscription profile may include information for a UPDN subscription, such as whether a UPDN instance is currently enabled or disabled. UPDN may be provisioned in a (e.g., 5G) network.

Local/device-to-device (D2D) connection to a UPDN may be enabled and/or managed by a (e.g., 5G core) network. WTRU-hosted session management function (USMF) may be present on a WTRU. For example, USMF may control packet data unit (PDU) session establishment to a UPDN instance. WTRU-hosted user plane function (UUPF) may be present on a WTRU. For example, UUPF may be a data plane entity that has the role of a user plane function (UPF) on a PDU session between a WTRU and UPDN.

In examples, a WTRU for providing a network may be provided. The WTRU may include a processor. The processor may be configured to determine a first network to be registered. The first network may be provided by the WTRU. The processor may be configured to send a first message to a second network. The first message may indicate a network name associated with the first network, indicate that the WTRU is able to provide the first network, and indicate a request to register the first network. The processor may be configured to receive a second message from the second network. The second message may indicate the network name associated with the first network and indicate that the first network has been registered. The processor may be configured to send a third message to a network client via a data session established using the first network.

BRIEF DESCRIPTION OF THE DRAWINGS

FIG. 1D is a system diagram illustrating a further example RAN and a further example CN that may be used within the communications system illustrated in FIG. 1A according to an embodiment.

FIG. 9 illustrates an example WTRU selection policy, which may be a UPDN-aware WTRU route selection policy.

FIG. 11 illustrates an example data network configuration information, such as a UPDN profile.

FIG. 12 illustrates an example data network configuration information, such as UPDN information fields in a subscription profile.

FIG. 14 illustrates an example operation of an application programming interface (API) for a WTRU provided data network, such as a UPDN.

FIGS. 17A-B illustrate an example for establishing a session, such as a PDU session, with a WTRU provided data network, such as a UPDN instance.

DETAILED DESCRIPTION

Figure 1A:
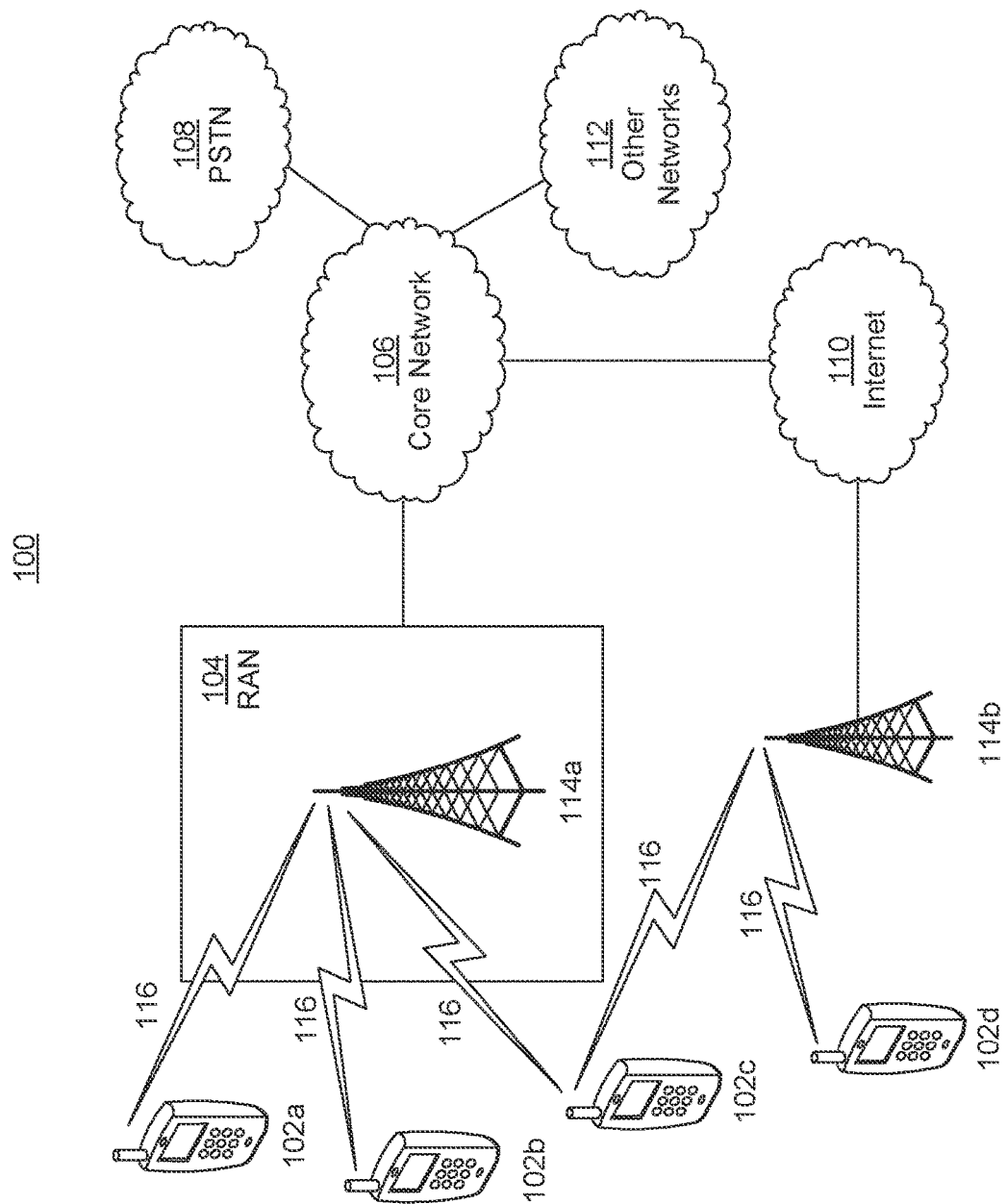
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or M-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication ink (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*. 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
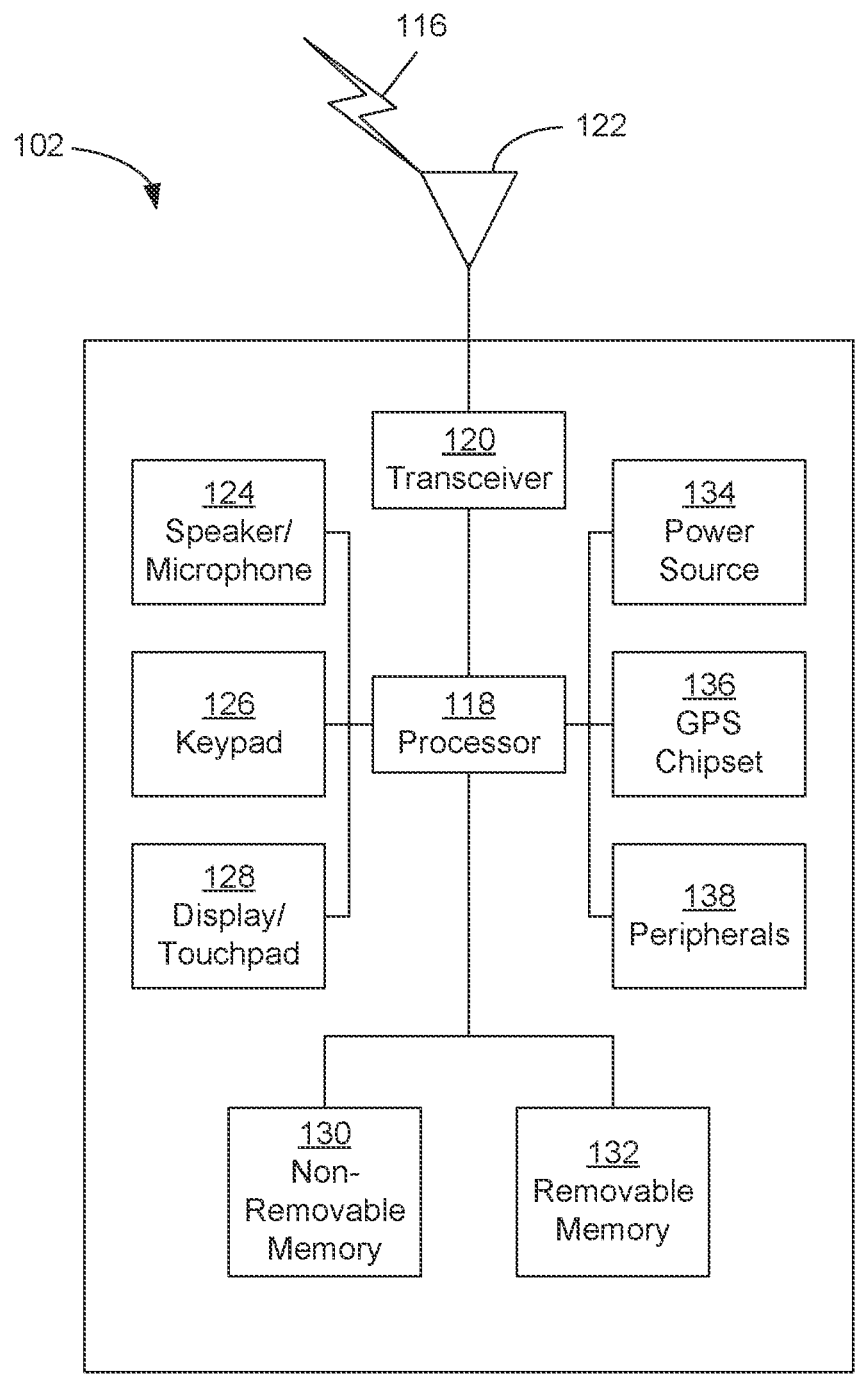
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
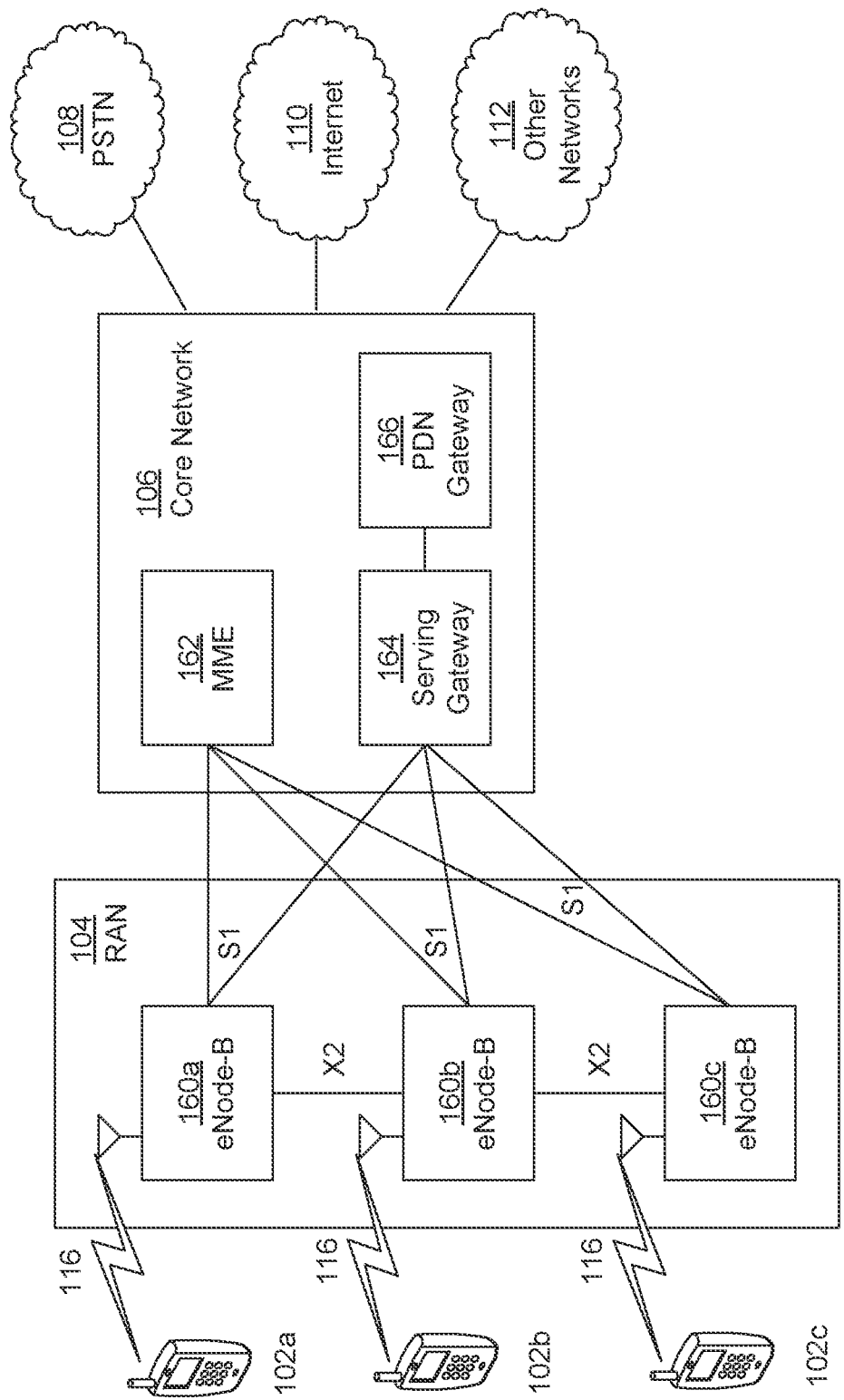
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMNCA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b. 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a. 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a. 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more at WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

UE/WTRU-provided data network (UPDN) may be a data network hosted on a WTRU. By way of example, WTRU described herein may be or may include a UE, and UE-provided data network may be interchangeably referred to as a WTRU-provided data network. A hosting WTRU may activate a UPDN instance, may obtain an authorization to host a UPDN instance, and/or may establish policy-based communication to a UPDN instance. A UPDN may be provision in a network (e.g., a 5G network). Local packet data unit (PDU) session management may exist, e.g., inside a WTRU.

A UPDN may be introduced.

A network (e.g., a 5G network) may connect a WTRU(s) to data networks (DNs) and/or local area data networks (LADNs). DNs and/or LADNs may be accessed (e.g., by a WTRU) through an access network (e.g., a radio access network (RAN)) and/or through UPFs located in a system (e.g., 5G system). UPFs may be in a network (e.g., a 5G core network) or collocated with an access network node.

A UPDN may be a data network hosted on a WTRU. A UPDN may be made available by a hosting WTRU to an application(s) running on the hosting WTRU, other WTRUs, and/or other data networks. Being hosted on and/or provided by a WTRU may be an example characteristic of a UPDN.

A UPDN may include one or more characteristics that are not used (e.g., optional) to one or more (e.g., all) UPDNs.

In (e.g., additional and/or alternative to), a UPDN may be a virtual network on a hosting WTRU, connected to a virtual router, and/or hosting a virtual machine (VM) (e.g., an existing VM, a software container, etc.). In examples, secure isolation may exist between the UPDN and the host WTRU (and/or between different UPDNs).

In (e.g., additional and/or alternative to) examples, a UPDN may include a physical network segment(s), e.g., in a distributed WTRU resulting from one or more of an augmented reality visor, a smartphone, a smart watch, and/or other wearable devices. For example, a UPDN hosted by a gateway/WTRU may include a local area network or a personal area network connecting one or more compute/storage nodes to the gateway/WTRU.

Communication between a WTRU and a UPDN may be controlled by an operator (e.g., a 5G operator), which may enable managing provisioning, access control, charging, QoS, transfer of a server between a UPDN and an in-network DN, and/or may ensure that a (e.g., 5G) feature(s) is available to UPDN connectivity.

In examples, WTRU for providing a network may be provided. The WTRU may include a processor. The processor may be configured to determine a first network to be registered. The first network may be provided by the WTRU. The processor may be configured to send a first message to a second network. The first message may indicate a network name associated with the first network, indicate that the WTRU is able to provide the first network, and indicate a request to register the first network. The processor may be configured to receive a second message from the second network. The second message may indicate the network name associated with the first network and indicate that the first network has been registered. The processor may be configured to send a third message to a network client via a data session established using the first network.

Figure 2:
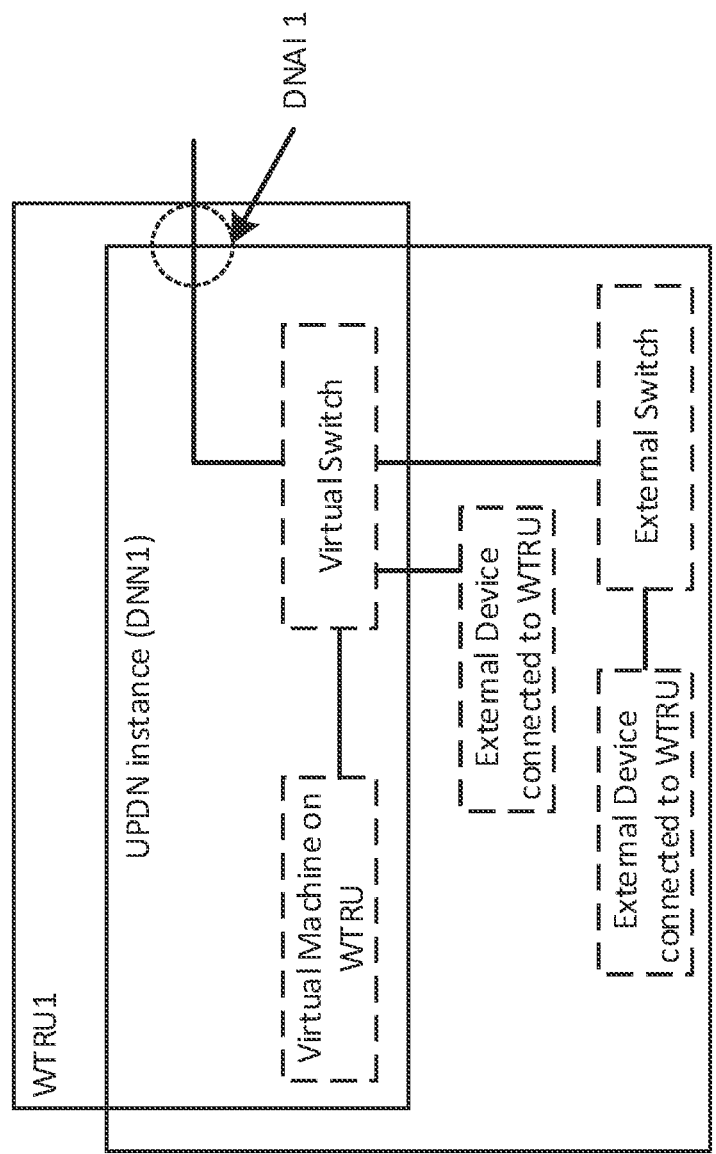
FIG. 2 illustrates an example of a data network (DN) provided by a WTRU such as a user equipment (UE) provided data network (UPDN).

FIG. 2 illustrates an example of a data network (DN) provided by a WTRU such as a user equipment (UE) provided data network (UPDN). The UPDN instance may be composed of computing nodes collocated with a WTRU, which may be a Virtual Machine (VM) on the WTRU, or an external device connected to the WTRU, e.g., using a wireless or wired connection as disclosed herein. Virtual and external network nodes such as network switches and routers may be interconnected with the computing nodes and enable connectivity between them.

Instances (e.g., all instances) of a WTRU provided data network, such as UPDN, described herein, may include computing nodes on the WTRU and/or external computing nodes attached to the WTRU. A UPDN made available by a WTRU may equivalently be described as "hosted on" or "hosted by" the WTRU.

A data network that is not provided by a WTRU, e.g., a non-user equipment (UE)/WTRU-provided data network (N-UPDN), may be distinguished from a data network that is provided by a WTRU, such as a UPDN. A N-UPDN is a data network that may be connected to a network (e.g., 5G network) through a fixed edge router, e.g., a User Plane Function (UPF) located in the core network. Furthermore, a hybrid DN may designate a DN composed of one or more N-UPDN components, and one or more UPDN components. A Data Network Name (DNN) may identify a N-UPDN, a UPDN, and/or a hybrid DN.

Edge computing may be implemented in a mobile network, such as a 5G network. An example edge computing framework (e.g., a 5G edge computing framework) may involve an edge enabler client (EEC) component on a WTRU, an edge configuration server (ECS) in an operator of a network (e.g., a 5G network of an operator), and/or an edge enabler server (EES) in a data network. A service provider may register EES with ECS. A communication between an edge application client (EAC) on a WTRU and an edge application server (EAS) in a data network may be established. The addresses/names of one or more ECSs may be configured on a WTRU. A WTRU may select an ECS for a given request. Upon a service provisioning request from a WTRU/EEC is received, ECS may send back WTRU/EEC connectivity information for a suitable EES. The WTRU/EEC may establish connectivity with the selected EES and/or send to the selected EES an EAS discovery request EES may select an EAS (e.g., in the same data network) and/or send back to the WTRU/EEC connectivity information for the EAS. The WTRU may establish connectivity between EAC and EAS.

Figures 3A, 3B, 3C:
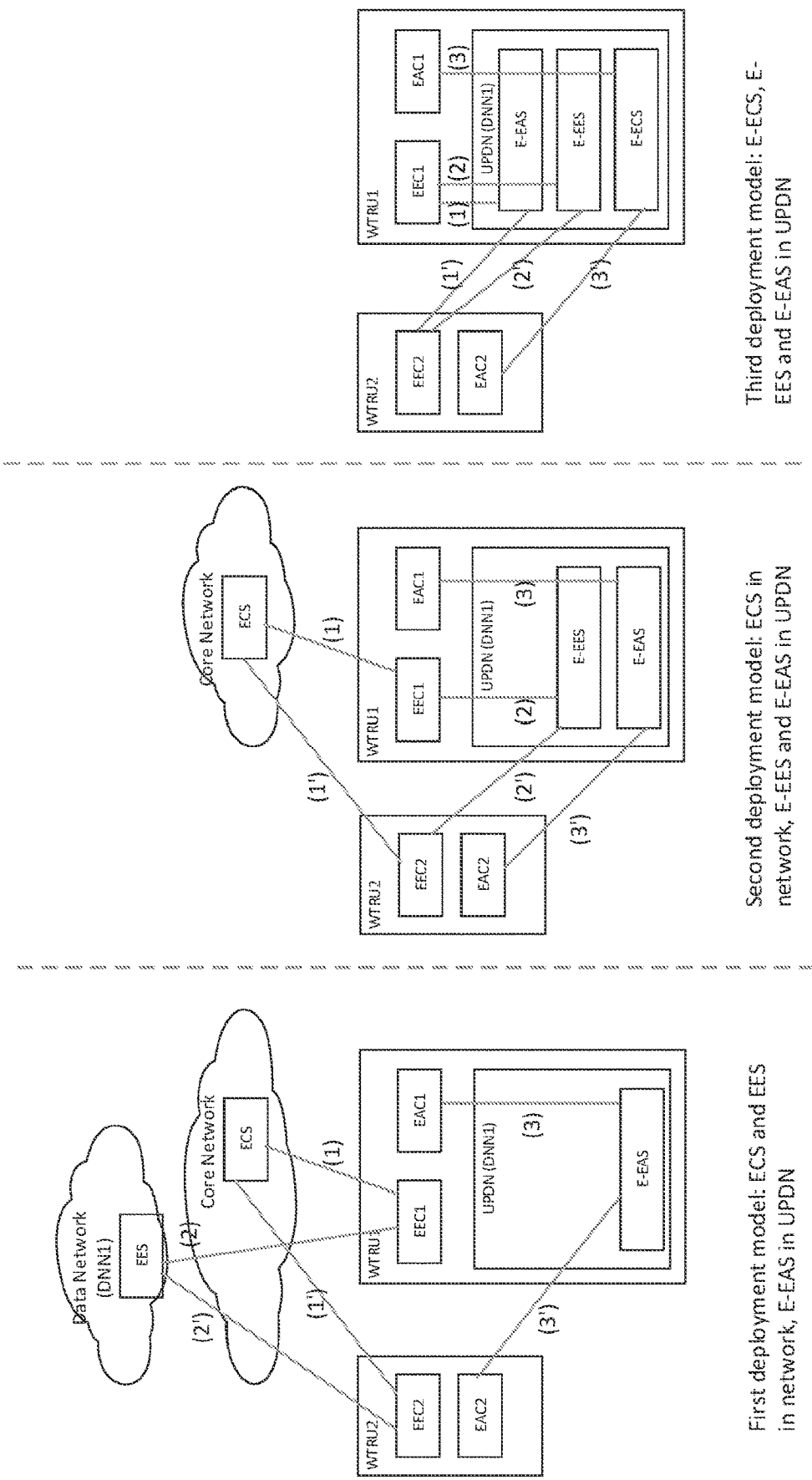
FIGS. 3A-C illustrate example deployments that may be used to support edge computing in a mobile network, such as a 5G network.

Edge computing may be implemented over a WTRU provided data network, such as UPDN. In examples, an edge computing service(s) may be deployed in one or more (e.g., part on) WTRUs in UPDNs. FIGS. 3A-C illustrate example deployments that may be used to support edge computing in a mobile network, such as a 5G network.

In FIGS. 3A-C, a prefix E- (e.g., in E-EAS, E-EES, E-ECS) may be used to differentiate between an embedded (E-) and in-network version of a component E-EAS, E-EES, E-ECS may be equivalent (e.g., functionally equivalent) to EAS, EES and/or ECS and may be deployed in a UPDN (e.g., in a software container on WTRU1). Examples of interfaces may include: (1) EEC to ECS used to obtain the EES location; (2) EEC to EES used to obtain the EAS location; and/or (3) EAC to EAS for application communication. Client-server communication may be established between edge application client EAC1 or EAC2 and edge application server E-EAS.

In an example deployment model shown in FIGS. 3A, ECS may be deployed in a network (e.g., a core network), and EES may be deployed in a data network (e.g., named data network name1 (DNN1)). A UPDN on WTRU1 may belong to a data network, such as a DNN1. EES may be configured to be aware of server instances (e.g., E-EAS) in UPDN. A WTRU may interact with other computing framework (e.g., a 5G edge computing framework). For example a WTRU may send a service provisioning request to ECS, and the ECS may provide connectivity information corresponding to EES. The WTRU may proceed with sending an EAS discovery request to EES. EES may select an in-UPDN E-EAS and send back to the WTRU. For example, the EES may send an IP address of the selected E-EAS. E-EAS may be a program running in a VM/container in the UPDN on WTRU1. EES and EAS may be in the same data network (DN) (e.g., DNN1). E-EAS may be in a UPDN portion of DNN1.

In an example deployment model shown in FIG. 3B, E-EES may be deployed in a UPDN. A service provider may register E-EES in ECS. A WTRU may interact with an edge computing framework (e.g., a 5G edge computing framework). A WTRU may send a service provisioning to ECS, and the ECS may provide connectivity information corresponding to E-EES (e.g., domain name DNN1 and IP address of E-EES locally present on the requesting WTRU). As described herein, E-EES may select E-EAS upon request from the WTRU.

In an example deployment model shown in FIG. 3C, E-ECS may be deployed in a UPDN. A WTRU may be configured with one or more E-ECS communication parameters (e.g., IP address) and/or other ECSs located in a network. If a WTRU determines that service discovery is to be initiated, the WTRU may select a E-ECS (e.g., a local E-ECS), e.g., if there is no reliable communication with the core network. As described herein, the service discovery process may proceed using E-ECS. E-EES, and/or E-EAS.

In a deployment model shown in FIGS. 3A-C, if an application client EAC2 is on a different WTRU2, EEC2 (e.g., an EEC on UE2) may discover E-EAS through ECS/E-ECS (e.g., shown 1' of FIGS. 3A-C) and/or EES/E-EES (e.g., 2' of FIGS. 3A-C). EAC2-E-EAS connectivity may be established (e.g., 3' of FIGS. 3A-C). One or more connections (e.g., shown in FIGS. 3A-C) may be device-to-device (D2D) connections, e.g., depending on the deployment model (e.g., EEC2-E-ECS, EAC2-E-EES, and/or EAC2-E-EAS).

Using UPDN as described in FIGS. 3A-C, one or more of the following may be provided: a network or a WTRU may contribute to a selection of an in-network EAS or on-WTRU E-EAS; a service network may be transferred to/from a WTRU (e.g., based on network connectivity); WTRU-provided compute capacity may complement or replace in-network compute capacity; in cases of loss of connection to a network, a WTRU may use an E-EAS (e.g., locally); and/or one or more UPDNs may coexist on a WTRU and may enable multiple edge computing services to deploy E-EASs on a WTRU, e.g., while maintaining secure isolation.

A network (e.g., through ECS or EES) and/or a WTRU (e.g., through EEC) may contribute to a selection of an in-network EAS or on-WTRU E-EAS. A WTRU and/or a network may select E-EAS to obtain low latency and/or may select EAS for saving battery and making use of higher compute power at the edge (e.g., than on the WTRU). A service(s) that supports EAS and/or E-EAS (e.g., programs that do not need an excessive amount of compute power and/or memory) may implement as described herein.

If a service provided by EAS degrades (e.g., poor network connectivity), a service network may be transferred to a WTRU (e.g., or vice-versa if the situation is reverted). E-EAS running on a WTRU may uses resources and/or may drain battery power. Transferring service to E-EAS may maintain low latency.

WTRU-provided compute capacity may complement or replace in-network compute capacity, e.g., in a densely populated area. One or more WTRUs may host E-EAS (e.g., and in some deployments E-EES and/or E-ECS) for one or more services. Other WTRUs may connect to the one or more services over D2D. In cases of loss of connection to a network, a WTRU may use an E-EAS (e.g., locally). One or more UPDNs may coexist on a WTRU and may enable one or more edge computing services to deploy E-EASs on a WTRU, e.g., while maintaining secure isolation.

Edge computing over a WTRU provided data network, such as UPDN, may be used in one or more examples described herein. UPDNs may host one or more types of programs and/or services. As an example, edge computing services may be used for UPDNs. Edge computing scenarios using UPDNs may depend on preserving privacy, sharing WTRU computing/storage resources between service providers, and/or reducing latency. Examples of edge computing scenarios using UPDNs may include: a distributed temperature control application including a program(s) running in UPDNs in a IoT gateway(s); a distributed industrial application(s) running within a gateway(s) inside a plant; a distributed face recognition pre-processing a video in UPDNs located in cameras and/or devices nearby; multiple edge computing service providers sharing platforms on a same gateway/camera/WTRU; virtual RAN (vRAN) implementing a distributed RAN function; and/or games/office applications.

A distributed temperature control application may include a program(s) running in UPDNs in a IoT gateway(s). The programs may run temperature control feedback algorithms, using temperature readings from sensors and/or set temperature target into an actuator(s). The programs may be deployed by a service provider (e.g., a home automation service provider), the programs may run (e.g., run entirely) within a IoT gateway(s) (e.g., inside a building(s)). The temperature readings may not be sent or used outside of the building(s) and may protect privacy and/or strengthen security. The programs may move between gateways and/or other WTRUs located within the building, e.g., for load balancing.

One or more distributed industrial applications may run within one or more gateways inside a plant. The output of industrial sensors may be processed within the plant, for example, to reduce the risk of leaking sensitive information outside the plant.

A distributed face recognition may pre-process a video (e.g., a high resolution video) in UPDNs located in cameras and/or devices nearby. Pre-processing output may be sent out as a low throughput stream of information towards an enterprise/service network, where later stages of the face recognition software pipeline may take place. The system using UPDNs described herein may substitute the distributed video processing application with one or more applications from other application provider(s).

One or more edge computing service providers may (e.g., securely) share platforms on a same gateway/camera/WTRU, e.g., similar to how data center hosts are shared in a data center (e.g., between edge platforms such as edge.amazon.com and/or edge.microsoft.com). A (e.g., 5G) stack on a WTRU may be utilized to enforce access control to different UPDNs and may increase security. The level of security may depend on an implementation of the (e.g., 5G) stack on the WTRU and/or on physical security of the WTRU. The mobile network may record usage statistics relative to UPDN communication and may charge and/or audit.

vRAN may implement a distributed RAN function, e.g., for one or more base stations. vRAN components (e.g., running on servers in a private data network) may (e.g., in some cases) run on UPDNs (e.g., on WTRUs such as smart phones, gateways, IoT devices, etc.). vRAN software components eligible to run on a WTRU may include RF measurements related to cellular neighbors, WiFi measurements, measurements from temperature sensors on a WTRU, and/or location measurements. The components may be relocated (e.g., dynamically relocated) between a WTRU and in-network servers, e.g., depending on a WTRU and network load.

A WTRU application (e.g., office application and/or game applications in an enterprise/service network) may have one or more software components running in a network (e.g., for video rendering, multi-player server-side logic, etc.). A controller in a network or on a WTRU may decide to run one or more of the software components on the WTRU itself and/or in a network (e.g., depending on the situation). For example, if the network performance is low, one or more components may run on the WTRU, e.g., to improve user experience and/or reliability. If the network performance improves, the components may be transferred back in the network, e.g., to save battery life on the WTRU.

Figure 4:
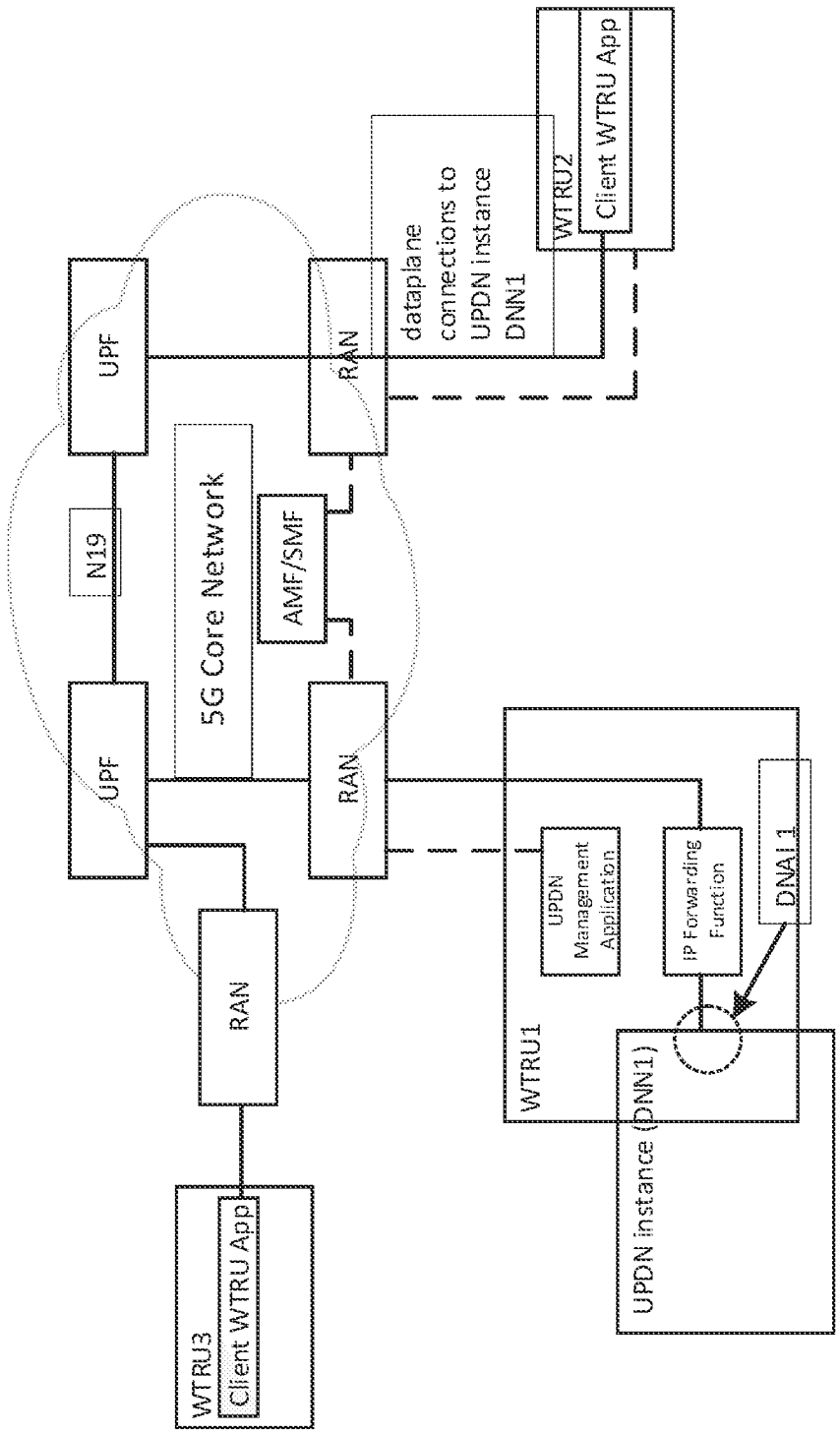
FIG. 4 illustrates an example of a use case where a WTRU connected to the network (e.g., 5G network) may access a UPDN provided by another WTRU.

FIG. 4 illustrates an example of a use case where a WTRU connected to the network (e.g., 5G network) may access a UPDN provided by another WTRU. A WTRU (WTRU1) makes a UPDN, identified as DNN1, available to the network (e.g., 5G network). WTRU1 may be called a WTRU DN provider and/or a UPDN provider WTRU. Another WTRU (WTRU2 or WTRU3) attached to the network (e.g., 5G network) may initiate communication with DNN1. WTRU2 and WTRU3 may be called WTRU DN consumers and/or UPDN consumers. The network may establish communication between WTRU2 (or WTRU3) and the UPDN provided by WTRU1, for example, as described herein in FIGS. 18A-B. WTRU2 and WTRU3 represent different WTRUs that may (e.g., both may) establish communication with DNN1. The connection between WTRU2 and the UPDN may be through a tunnel between two UPFs (e.g., because WTRU2 is physically or topologically far from WTRU1, and therefore may use different anchor UPFs), while the connection between WTRU3 and the UPDN may be through a single UPF (e.g., because WTRU3 is close to WTRU1, and therefore may use the same anchor UPF). The network operator may (e.g., may also) decide to opt for using a single anchor UPF in cases (e.g., all cases), or for using distinct anchor UPFs in cases (e.g., all cases). WTRU1 may configure its (e.g., IP) forwarding function to enable forwarding traffic between the UPDN domain (e.g., UPDN IP subnets) and WTRU2/WTRU3. WTRU1 may (e.g., may also) include a UPDN management application/component/function, which may enable establishing connectivity, e.g., as described in FIGS. 18A-B. The UPDN management/component/function may be a component of the mobile communication stack on the WTRU, and/or a user space application.

In examples, the use case in FIG. 4 may enable WTRU2 and/or WTRU3 to access to edge computing resources in the UPDN provided by WTRU1. In examples, the use case in FIG. 4 may enable accessing the Internet or a private network through the UPDN provided by WTRU1. In examples, the use case in FIG. 4 may enable instances of a distributed application (e.g., federating learning application), which may be located in WTRUs or in devices connected to the network (e.g., 5G network) through WTRUs, to connect to each other. The WTRU hosting the distributed application instances may be configured to provide a UPDN with a DNN that is specific to the application and enable application instances to communicate with each other over PDU sessions associated with this DNN.

WTRU provided data networks, such as UPDNs, may be implemented in a mobile (e.g., 5G) network additionally/alternatively to application-layer coordination between edge computing platform software on a WTRU and edge computing services in a network. For example, an application component running on a WTRU may start local E-EAS programs and/or communicate with an edge computing service application component in a network (e.g., that decides on which WTRU to run an EAS instance). In this example, a mobile network (e.g., a 5G network) may be unaware of the edge computing platform on the WTRU, e.g., except that the edge computing platform on the WTRU is an application that communicates over the network. One or more of the following may occur extra network resource usage and/or service load; and/or inefficient integration with 5G.

Extra network resource usage and service load may occur. For example, depending on the deployment model, EES in a network may (e.g., need to) be aware of E-EAS status and/or locator (e.g., IP address, fully qualified domain name (FQDN), MAC address, etc.) or ECS in the network may (e.g., need to) be aware of E-EES status and/or locator. E-EES/E-EAS may register/deregister with an in-network ECS/EES, when the WTRU registers/deregisters with the network, that ECS/EES has up-to-date information. High traffic load on ECS/EES may occur and/or may consume extra network resources for a subscriber. More traffic load on ECS/EES and/or extra consumption of network resources may occur in a distributed setting(s), e.g., where a software platform is distributed over one or more WTRUs using a gossip protocol to share connectivity information between the WTRUs.

Integration (e.g., inefficient integration) with a (e.g., 5G) network may occur. For example, a 5G network may be based on an assumption that edge computing services (e.g., EES, EAS, and/or the like) are in a DN. Support for services not located in a DN may result in more complex examples where on-WTRU programs are treated as specific cases. Enabling DNs on a WTRU may reuse and/or generalize 5G examples to include WTRU-hosted services. Examples features may be charging, access control, QoS control, and/or the like.

Using UPDNs as described herein may resolve extra network resource usage and/or service load and/or integration with a (e.g., 5G) network. For example, UPDN state information may be relayed (e.g., relayed efficiently) by a (e.g., 5G) network to external edge computing services (e.g., based on UDPNs being data networks).

As described herein, a UPDN may be a data network hosted on a WTRU and/or made available by a hosting WTRU to an application(s) running on the hosting WTRU, other WTRUs, and/or other data networks.

Figure 5:
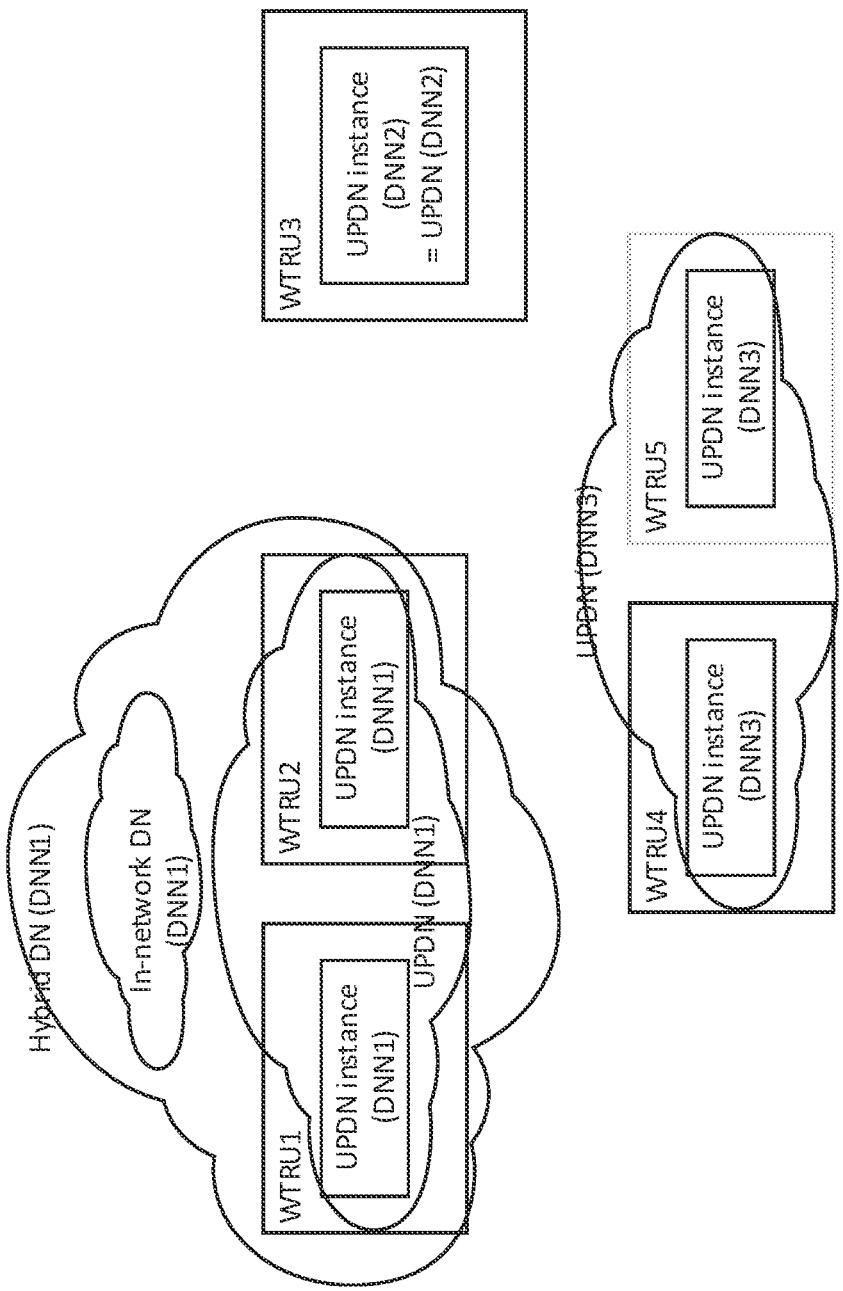
FIG. 5 illustrates example data networks (DNs) provided by a WTRU, such as a UPDN, an in-network DN, and/or a hybrid DN.

A UPDN may be associated with a DNN and DN access identifier (DNAI). FIG. 5 illustrates example data networks (DNs) provided by a WTRU, such as a UPDN, an in-network DN, and/or a hybrid DN. For example, FIG. 5 illustrates an example UPDN in an isolated DN with a (e.g., unique) DN name (e.g., DNN2). In (e.g., additional and/or alternative to) examples, one or more UPDN instances may (e.g., together) share a (e.g., unique) DNN and/or form a logical UPDN (e.g., DNN3). In (e.g., additional and/or alternative to) examples, one or more UPDN instances may share a DNN with an in-network DN and may form a hybrid DN including an in-network and on-WTRU portions (e.g., DNN1). A WTRU hosting a UPDN may be an access point to the UPDN and may be associated (e.g., for the purpose of implementing a 5G example) with a DNAI for the DN that the UPDN belongs to. The term UPDN described herein may, for example, represent a UPDN instance or a UPDN as a whole (e.g., the UPDN instance and/or the UPDN as a whole for WTRU 3 in FIG. 5 may point to the same entity). FIG. 5 illustrates an example UPDN, such as UPDN, in-network DN, and/or a hybrid DN.

UPDNs may differ from DNs (e.g., existing DNs or LADNs). UPDN may be hosted on a WTRU, while a DN (e.g., an existing DN) may be a network entity. One or more of the following may occur UPDN availability may be dependent on power and/or network state of a hosting WTRU; a WTRU may wish to turn a UPDN on/off to account for current context; UPDN may be mobile while one or more DNs may not be; and/or a WTRU may provide access to UPDN, while UPF may provide access to DN.

UPDN availability may be dependent on power and/or network state of a hosting WTRU (e.g., on/off, registered/not registered, and/or the like), while a DN may be available except in cases of failure or maintenance. UPDN availability may be impacted by the battery-powered nature of some WTRUs.

A WTRU may wish to turn a UPDN on/off to account for current context (e.g., low battery, plugged in, user input, current computing load or memory usage, etc.).

UPDN may be mobile while one or more DNs may not be.

A WTRU may provide access to UPDN, while UPF may provide access to DN.

UPDNs in a mobile (e.g., 5G) network(s) may consider one or more of the following: mechanisms for WTRUs to advertise the support for and/or the state of UPDNs; mechanisms for facilitating by edge computing service operators and/or authorizing hosting of UPDNs; mechanisms for one or more WTRU subscribers, network operators, and/or (e.g., edge computing) service operators; mechanisms for associating a DNN with a UPDN; and/or mechanisms for handing a local connectivity to UPDNs as a PDU session.

Mechanisms may be developed for WTRUs to advertise the support for and/or the state of UPDNs.

Mechanisms may be developed for facilitating by edge computing service operators and/or authorizing hosting of UPDNs (e.g., authorizing legitimate hosts holding up-to-date UPDN software).

Mechanisms may be developed for one or more WTRU subscribers, network operators, and/or (e.g., edge computing) service operators, e.g., to influence connectivity to UPDNs through policies.

Mechanisms may be developed to associate a DNN with a UPDN.

While local connectivity to UPDNs may be internal to a WTRU, mechanisms may be developed to handle the local connectivity to UPDNs as a PDU session (e.g., a 5G PDU session), e.g., to use PDU session related operations, such as access control, metering, charging, QoS control, and/or the like.

In an example, there may not be a mechanism enabling a WTRU (e.g., WTRU2) to establish, through the core network, a connection (e.g., a PDU session) towards a DN (e.g., identified with DNN1) that is provided by a WTRU (e.g., WTRU1). Establishing WTRU2-WTRU1 connectivity in response to a PDU session establishment request from WTRU2 using the DNN of a UPDN may be provided. The resulting PDU session between WTRU2 and UPDN/WTRU1 is named herein a "UPDN PDU session".

In a WTRU-based selection process, WTRU2 may be able to select (e.g., using a slice ID such as S-NSSAI, or other information element) whether a PDU session establishment should, should not, or may use a UPDN, when the provided DNN identifies a hybrid network. In a network-based selection process, e.g., in the case where the DNN used in a PDU session establishment request identifies a hybrid DN, the network (e.g., 5G network) may select whether to establish connectivity between WTRU2 and N-UPDN component or UPDN component identified by the requested DNN (e.g., based on network configuration and/or requested slice ID).

One or more functions described herein may be used to support UPDN with a mobile (e.g., 5G) network(s). For example, functions related to activation may be used to support UPDN with a mobile network.

UPDN activation may make UPDN availability known to a mobile network and/or avoid over-the-air signaling to maintain the availability state of services hosted in the UPDN. A WTRU may communicate, e.g., to a network, the availability of active UPDNs that the network hosts, e.g., by including a list of activate UPDN DNNs in a network registration message. The network (e.g., AMF) may use the list to maintain a UPDN activation state in the network. The network may communicate UPDN events/status to one or more service providers.

UPDN authorization and/or software deployment support may enable (e.g., edge computing) one or more service operators to control which WTRU is allowed to host a UPDN instance for a given DNN and/or facilitate deploying and maintaining UPDNs. The network (e.g., AMF) may determine that UPDN authorization (e.g., authorization for a WTRU to host a UPDN) may be needed and/or may trigger UPDN authorization with a DN-AAA server. During the authentication/authorization process, a WTRU may communicate authentication and/or UPDN-related information elements to the DN-AAA. The service operator may authenticate the WTRU, verify that the WTRU is authorized to host a UPDN for a given DNN, and/or verify that a UPDN software application is valid and/or up to date. For example, in case of version mismatch, the service operator may decline authenticating the WTRU and/or trigger a software installation update.

UPDN routing control may enable a WTRU subscriber a network operator, and/or a (e.g., an edge computing) service operator to influence connectivity to UPDNs. Traffic routing towards UPDN may be managed through a policy, e.g., a WTRU may select a WTRU route selection policy (URSP) rule including UPDN type indicating that DNN relates to a UPDN instance (e.g., local or D2D) and/or a remote DNN (e.g., a remote existing DNN). A WTRU may use the selected URSP rule to setup connectivity to a UPDN instance.

One or more associations (e.g., between UPDN DNN, WTRU IDs, etc.) related to UPDN support may be provisioned into a network. For example, AF may provision UPDN information using PCF/NEF application programming interface (API) that may populate a UPDN profile and/or UPDN information in a WTRU subscription profile.

UPDN PDU connectivity support may be an example (e.g., additional and/or alternative to) to a local (e.g., non-standard) connectivity establishment towards a local UPDN, establishing and managing a local (e.g., 5G) PDU session (e.g., identified with a 5G PDU session ID and/or supporting 5G parameters) and/or leveraging a feature(s), such as access control, metering, charging, and/or QoS control. A WTRU may support PDU session establishment of local or D2D connectivity to UPDN, involving in-network SMF, and/or WTRU-hosted SMF (USMF) and UPF (UUPF) functions.

Figure 6:
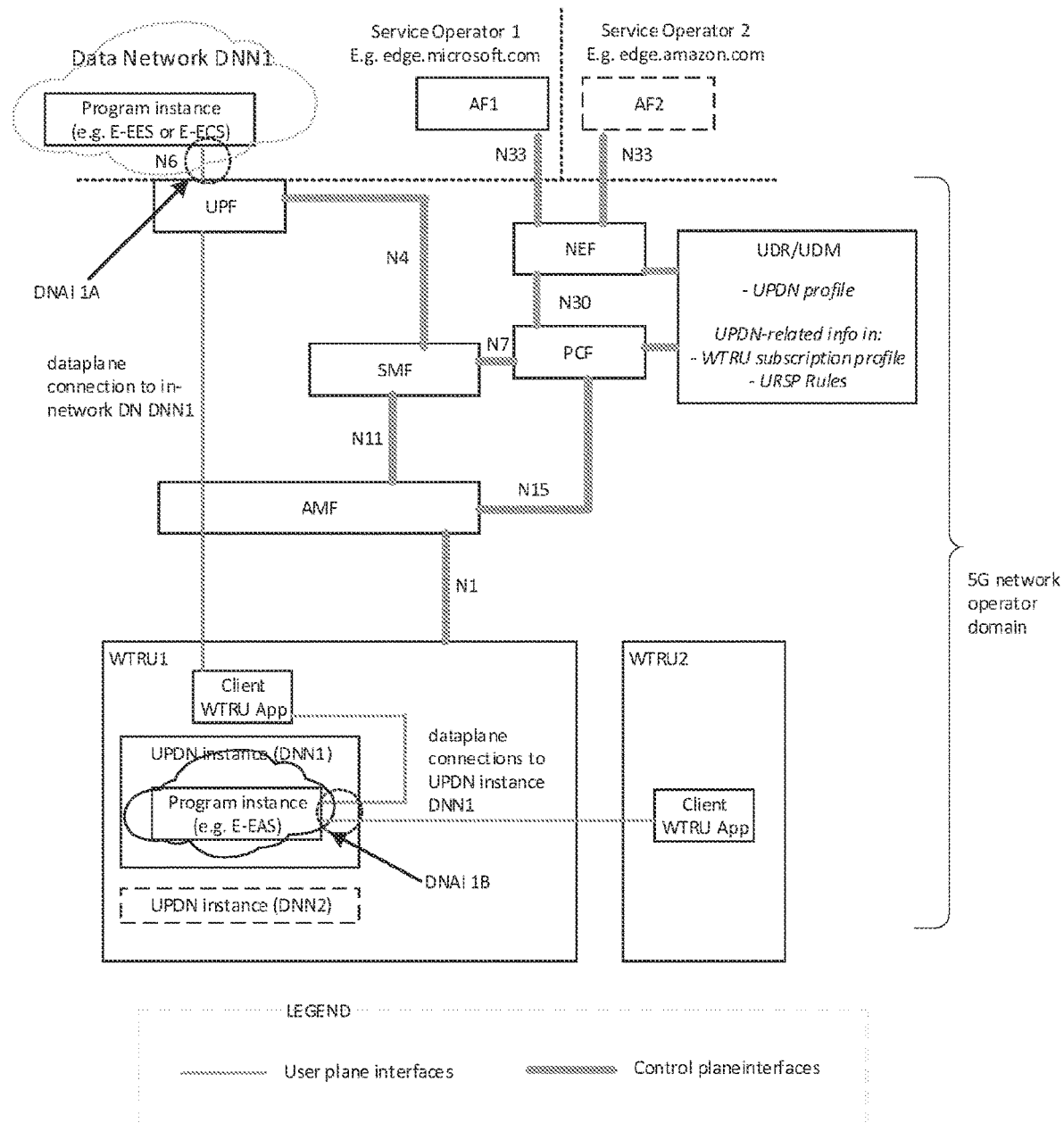
FIG. 6 illustrates an example architecture for deployment and/or operation of one or more UPDNs.

FIG. 6 illustrates an example architecture for deployment and/or operation of one or more UPDNs. UPDN instances may be present on a WTRU. A UPDN may be implemented through a set of software components (e.g., hosting environments, software bridges, software routers, and/or the like) deployed on a WTRU. Hosting environments may designate virtual machines/container environment/parent application (e.g., designated as virtual machines, VMs described herein) that may host applications in an isolated virtual environment. In examples, a UPDN instance may be implemented as a VM connected through a software bridge to a host WTRU network stack. In (e.g., additional and/or alternative to) examples, a UPDN instance may be implemented as a Linux namespace or software container platform that supports running software programs in an isolated environment. In (e.g., additional and/or alternative to) examples, a UPDN instance may be implemented using an actor framework able to run individual actors.

Programs hosted by a UPDN instance may be (e.g., from a 5G network standpoint) inside a data network (DN) associated with the UPDN. In FIG. 6, the DN named DNN1 may be a hybrid DN. The in-network portion of DNN1 may be accessed by setting a PDU session towards a UPF towards a DN access point identified with a DN Access Identifier (DNAI), e.g., DNAH1A. The UPDN instance on WTRU1 (e.g., associated with DNN1) may be accessed (e.g., accessed internally) by applications on WTRU1, over a device-to-device (D2D) connection by applications on WTRU2, and/or from applications running in a DN. D2D connections may be established using one or more technologies, e.g., including Proximity Services (ProSe), V2X Direct Communication Mode (e.g., PC5 Interface), 5G Local Area Networks (5GLAN), and/or the like. WTRU1 may provide access to the UPDN instance. WTRU1 may be associated with a DNAI for DNN1, e.g., DNAI1B.

WTRU1 network registration request may be used to activate/deactivate UPDN instances with AMF (e.g., over N1 interface). AMF may communicate with unified data repository (UDR) (e.g., through PCF over N15) to update state information associated with related UPDNs. WTRU1 and WTRU2 may hold policy information configured on a WTRU and/or obtained from PCF. Using the policy information, WTRU1 may set up (e.g., internally set up) data plane connectivity between a client application on WTRU1 and a server in a UPDN instance on WTRU1. Using policy information, WTRU2 may set up a D2D connection between a client application on WTRU2 and a server in a UPDN instance on WTRU1. WTRU1 may (e.g., as usual) establish a PDU session(s) between a local application and an in-network portion of DNN1.

A service provider(s) may provision UPDN information in a (e.g., 5G) network using a NEF/PCF API, e.g., over N33 interface towards NEF and N30 between NEF and PCF (e.g., a trusted service provider may communicate directly with PCF). A service provider may be a cloud service provider, edge cloud/computing service provider, public or private data network operator, enterprise network operator, home network operator (e.g., an end user), and/or the like. NEF and/or PCF may create and/or update a UPDN profile on UDR. WTRU subscription profile and policy rules (e.g., URSP rules) may hold UPDN-related information, in UDM/UDR (e.g., set by a network operator). PCF may propagate UPDN information to other nodes, such as SMF, AMF, UE, and/or (e.g., directly or through NEF) application function (AF). For example, an AF may register for receiving events from PCF/NEF, if a given UPDN or some instances of a UPDN becomes available or unavailable.

A DNN may identify an in-network DN, hybrid DN, and/or UPDN. A UPDN instance may be identified using the tuple (e.g., DNN, WTRU ID, and/or the like) and/or one or more UPDN instances may be identified using a tuple (e.g., DNN, WTRU group ID, and/or the like). A WTRU may activate and/or deactivate UPDN.

If a UPDN instance is deployed and/or running on a WTRU, the WTRU may advertise the UPDN instance as available or unavailable, to a network (e.g., turn the advertising off if the WTRU compute load is high or turn the advertising back on if the WTRU compute load is back to a normal level). For example, UPDN instance availability (e.g., referred to herein as UPDN instance activation and deactivation) may be provided by the WTRU in a network registration request, as described in FIG. 7.

Figure 7:
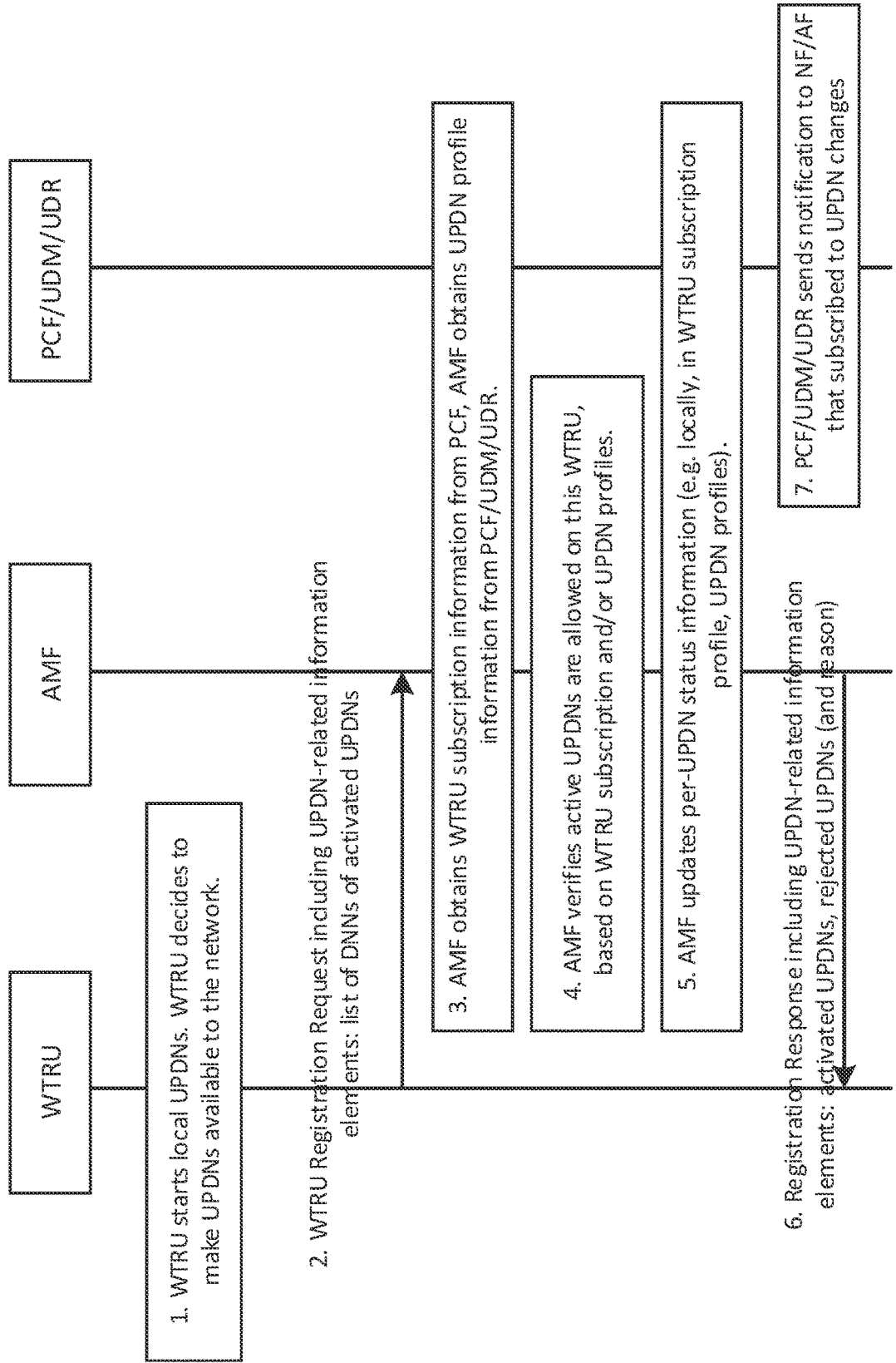
FIG. 7 illustrates an example UPDN activation and deactivation by a WTRU.

FIG. 7 illustrates an example UPDN activation and deactivation by a WTRU. The numbers shown in FIG. 7 may be presented for the purpose of reference. As such, the numbered actions may be performed in a different order (e.g., in whole or in part) and/or may be skipped. If a network (e.g., AMF) receives UDPN availability information from a WTRU (e.g., UPDN DNN may be present in a list of activated UPDN in registration message), the network may verify whether the WTRU is allowed to host UPDN (e.g., based on UPDN profile from service provider and/or based on WTRU subscription profile). The network may update an internal state information (e.g., UPDN profile in UDR). The update may trigger PCF/UDR/UDM to send an indication of availability change to one or more (e.g., all) network functions (NF) or application functions (AFs) that are registered for the event. For example, ECS may receive a UPDN (de-)activation indication that indirectly informs ECS about the availability of an E-EES inside the UPDN (e.g., ECS may use the information to decide whether to include E-EES in a request response). In (e.g., additional and/or alternative to) examples, EES may receive a UPDN (de-)activation indication that indirectly informs EES about the availability of E-EASs inside the UPDN (e.g., EES may use the information to decide whether to include E-EASs in a request response).

As shown in FIG. 7, a WTRU may start UPDN instances (e.g., if starting a client application that is configured to connect to a given DNN or in (e.g., additional and/or alternative to) examples at a WTRU startup time). The WTRU may determine a first network (e.g., UPDN) to be registered. The UPDN may be provided by the WTRU. The WTRU may determine that there may be one or more available local UPDNs instances. The WTRU may decide to make one or more local UPDNs instances available to a network (e.g., based on local configuration, input from end user, configuration from the subscription profile, and/or the like). One or more UPDNs may be made available to the network, while not being started (e.g., VM may not be running). If the one or more UPDNs are made available to the network (e.g., while not being started), the WTRU may start a UPDN on-demand if a connection is initiated towards the UPDN.

A WTRU may send a first message (e.g., registration request message) to a second network (e.g., an AMF). The registration request message may indicate a network name (e.g., DNN) associated with the UPDN, indicate that the WTRU is able to provide the UPDN, and indicate a request to register the UPDN. The registration request message may include UPDN-related information elements. For example, the UPDN-related information elements may include one or more of a list of DNNs, a (e.g., each) corresponding to a UPDN instance to activate, and/or the like. In (e.g., additional and/or alternative to) examples, one or more (e.g., other) UPDN ID may be used in addition to and/or alternative to DNN.

AMF may obtain WTRU subscription information from PCF and/or UPDN profile information from PCF/UDM/ UDR. AMF may verify that UPDNs in the list provided from the WTRU are allowed to be hosted on the WTRU (e.g., based on WTRU subscription including a list of UPDN DNNs that are allowed on the WTRU and/or based on UPDN profiles, a (e.g., each) UPDN profile including, for a UPDN, a list of WTRU IDs or WTRU group IDs designating WTRUs allowed to host an instance of the UPDN).

AMF may update per-UDPN status information, e.g., locally on the AMF, in WTRU subscription profile and/or UPDN profiles. UPDN instances with a DNN in the list provided from the WTRU may have an activated status. One or more (e.g., other) UDPNs may have a deactivated status. UPDNs that are found not to be allowed as described herein (e.g., based on the verification of the list from the WTRU) may have a rejected status.

The second network (e.g., AMF) may send a second message (e.g., registration response) back to the WTRU, including UPDN-related information elements. The registration response may indicate the network names associated with the UPDN and indicated that the UPDN has been registered. For example, AMF may include one or more of a list of activated DNNs, a list of rejected DNNs, a reason for rejection (e.g., not allowed in WTRU profile, or not allowed in UPDN profile, and/or the like), and/or the like.

PCF/UDM/UDR may send a notification to an AF/NF that are subscribed for UPDN related changes. For example, an edge computing ECS, acting as an AF/NF, may register for a change on a given UPDN (e.g., identified by its DNN) and/or use a notification(s) to determine how to respond to requests from WTRUs. Examples of a notification may include DNN, WTRU ID, status, and/or the like to indicate a change of status for a UPDN instance in a WTRU.

A WTRU may deactivate a UPDN by re-registering with a (e.g., 5G) network and/or omitting the deactivated UPDN in an activated UPDN list provided to AMF.

A WTRU may include, in a network registration request message, a flag indicating support for UPDN. If a flag is set, AMF may obtain, e.g., from WTRU subscription profile and/or UPDN profile, a list of UPDN DNNs. AMF may include, e.g., in a network registration response message, a list of UPDN DNNs. The WTRU may, e.g., based on this list, trigger an installation of UPDN application software. The WTRU may, e.g., based on this list trigger the activation of UPDN instances.

A network may authorize a WTRU to host a UPDN, and/or leverage an authentication/authorization to support UPDN installation and/or update.

A UPDN software application may be a program that may be transferred onto and/or installed on a WTRU, e.g., to implement a UPDN. The program may be one or more of a virtual machine image file suitable for execution over a given type of hypervisor, a software container image suitable for execution over an operating system, or an actor framework application.

Figure 8:
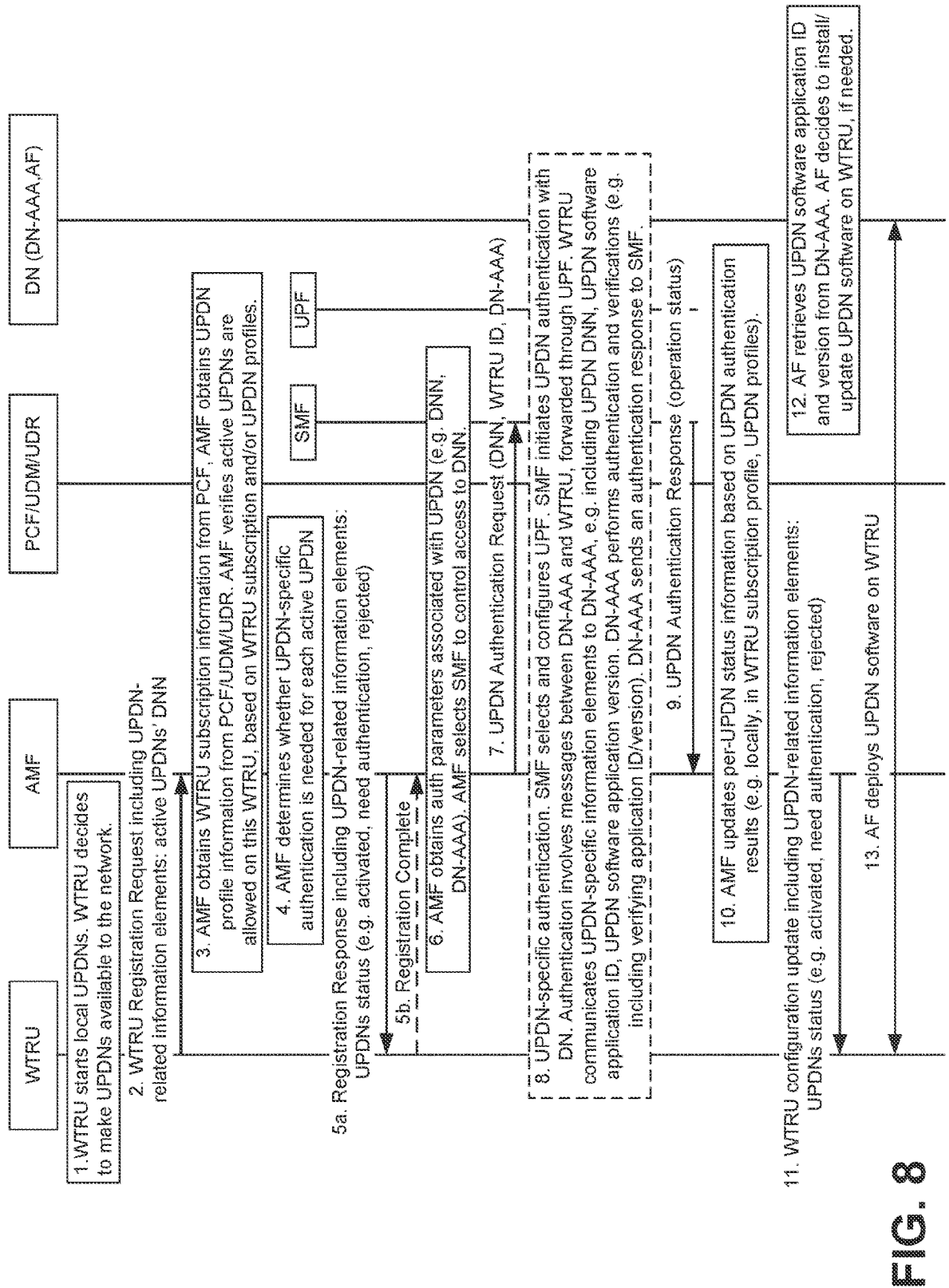
FIG. 8 illustrates an example WTRU authentication/authorization for hosting and/or providing a UPDN (e.g., and/or installation/update trigger).

FIG. 8 illustrates an example WTRU authentication/ authorization for hosting and/or providing a UPDN (e.g., and/or installation/update trigger). FIG. 8 illustrates an example WTRU authentication/authorization for hosting a UPDN (e.g., installation and/or update trigger). The numbers shown in FIG. 8 may be presented for the purpose of reference. As such, the numbered actions may be performed in a different order (e.g., in whole or in part) and/or may be skipped. For example, FIG. 8 illustrates UPDN authorization following UPDN activation. As shown in FIG. 8, a WTRU may seek to be authenticated and/or be authorized to host a given UPDN instance, e.g., by a service provider that is an owner of the DNN of the UPDN. In (e.g., additional and/or alternative to) examples, slice and/or DN authentication examples may authenticate/authorize WTRUs to access network resources, such as slices and data networks (e.g., in addition to and/or alternatively to host data networks).

UPDN authentication may be used to install/update UPDNs. For example, if an authentication fails because a UPDN software application is not up-to-date and/or not yet installed, UPDN installation/update may be triggered. UPDN installation/update may be performed by a software deployment framework. In (e.g., additional and/or alternative to) examples, an end user may install a UPDN software application through an app store. In (e.g., additional and/or alternative to) examples, an enterprise network administrator may bigger the installation/update through a software deployment tool. Installation/update may be performed preemptively (e.g., prior to activating UPDN) or reactively (e.g., in reaction to an attempt to activate UPDN).

FIG. 8 illustrates an example WTRU support for installing and/or updating UPDNs. As illustrated in FIG. 8, WTRUs may provide information to a service provider, e.g., through a DN-AAA server, as part of an authentication/authorization. For example, a WTRU may inform the network that the WTRU is capable and/or willing to install (e.g., new) UPDNs. For an already installed UPDN, a WTRU may provide UPDN software application ID and/or version. The service provider may use the information to trigger (e.g., based on a message from DN-AAA to AF) installing/updating UPDN.

FIG. 8 illustrates an example WTRU authentication/authorization for hosting a UPDN (e.g., and/or installation/update trigger).

Referring to FIG. 8, and as similarly shown in FIG. 7, a WTRU may perform one or more of the following: a WTRU may start UPDN instances (e.g., the WTRU may decide to make one or more local UPDNs instances available to a network); and/or a WTRU may send a registration request message including UPDN-related information elements; AMF may obtain WTRU subscription information from PCF and/or UPDN profile information from PCF/UDM/UDR (e.g., AMF may verify UPDNs in the list provided from the WTRU that indicates UPDNs allowed to be hosted on the WTRU).

For a (e.g., each) UPDN in a registration message, AMF may determine whether a UPDN-specific authentication is needed.

AMF may send a registration response to a WTRU. The registration response may include status information related to a (e.g., each) UPDN present in the registration request. Status may be active (e.g., authentication may be skipped), rejected, and/or authentication needed.

A WTRU may reply with a registration complete message.

For authenticating a (e.g., each) UPDN, one or more of the following may occur (e.g., once).

AMF may select SMF to control access to the DN that will handle authentication for the UPDN, e.g., using UDPN authentication information (e.g., from UPDN profile). The UPDN authentication information may include one or more of an authentication flag, an address of DN-AAA server(s), DNN where DN-AAA servers are located (e.g., which may be the same as or different from UPDN DNN), and/or the like.

AMF may send a UPDN authentication request message to SMF. The message may include DNN and/or DN-AAA servers addresses.

UPDN-specific authentication may involve SMF, DN-AAA server, and/or WTRU (e.g., messages between SMF and DN-AAA are forwarded through UPF and/or messages between DN-AAA and UE are forwarded through the 5G network). Secondary authentication used in PDU session establishment and/or slice-specific authentication used in a WTRU network registration may be used for UPDN-specific authentication. The UPDN-specific authentication described herein may be for DN-AAA to authenticate a WTRU and/or authorize the WTRU to host a UPDN instance associated with a specific DNN. SMF may select and/or configure UPF. SMF may initiate UPDN authentication with DN-AAA server. The DN-AAA server may communicate with the WTRU (e.g., in one or more round-trips). The WTRU may communicate UPDN-specific information elements to DN-AAA, e.g., including one or more of UPDN DNN, UPDN software application ID, UPDN software application version, and/or the like. The DN-AAA may perform authentication and/or verifications (e.g., including verifying application ID/version). The DN-AAA may send an authentication response to SMF.

SMF may send a UPDN authentication response message to AMF, e.g., including the success or failure status of the UPDN authentication operation.

AMF may update per-UDPN status information based on UPDN authentication results (e.g., locally, in WTRU subscription profile and/or UPDN profiles).

AMF may send a registration update to a WTRU, including status information related to UPDNs. The status information may include active (e.g., authentication may be skipped, or authentication was successful), rejected (e.g., authentication failed), and/or authentication needed (e.g., authentication did not complete yet).

In an example, DN-AAA may reject a UPDN authentication and may send a notification to an AF in DN, e.g., including UPDN information such as UPDN software application ID and/or version. In a case where the version is outdated or the application ID is obsolete, AF may decide to install/update UPDN software on a WTRU. AF may deploy the UPDN software on the WTRU, e.g., using a deployment software framework.

UPDN routing control may be provided.

URSP rules may be implemented to control connectivity, e.g., including path selection, to UPDNs. For example, routing policies (e.g., WTRU route selection policy, URSP, and/or the like) may enable a network and/or indirectly a service provider to influence a routing decision by a WTRU to communicate with a node(s) (e.g., server(s)) in a UPDN. If a WTRU determines that connectivity is to be established, the WTRU may select a first URSP rule that has a matching traffic descriptor and/or may use a route selection descriptor from the selected rule to establish connectivity, e.g., through a PDU session, a D2D connection, or an internal connection inside the WTRU. Using the (e.g., URSP) policies for UPDNs may skip the WTRU to determine locally (e.g., prior to looking at URSP rule) that a given locator (e.g., IP address, MAC address, or other type of address) is local to the WTRU. A URSP rule may state (e.g., clearly state) that the WTRU may connect to a node in a UPDN using a local, D2D, or usual network route. For example, the URSP rule may replace an implicit mechanism with an explicit mechanism. The URSP rule (e.g., the explicit mechanism) may specify (e.g., further specify) other connectivity characteristics, such as the slice ID (e.g., S-NSSAI), PDU session type (e.g., IP, Ethernet or unstructured), and/or the like.

UPDN-specific fields may be supported in URSP rules, e.g., to enable initiating communication with a UPDN. URSP rules may include UPDN-specific information, e.g., as described in FIG. 9.

FIG. 9 illustrates an example WTRU selection policy, which may be a UPDN-aware WTRU route selection policy. FIG. 9 illustrates an example UPDN-aware WTRU route selection policy. The UPDN connectivity control described herein may be associated with a URSP rule. In (e.g., additional and/or alternative to) examples, a URSP rule may be provided through a separate policy rule, e.g., provided to a WTRU by a network (e.g., PCF) and/or configured on the WTRU. In the URSP rule example, UPDN-related fields may be in a traffic descriptor and/or a route selection descriptor, e.g., along with a related DNN.

URSP rule evaluation triggers may be provided. A WTRU may receive one or more updated URSP rules and may (re-)evaluate validities (e.g., in a timely manner) if one or more conditions described herein are met. For example, the conditions may include one or more of the following: the URSP being updated by the PCF, the WTRU moving from EPC to 5GC, change of allowed NSSAI or configured NSSAI, change of LADN DNN availability, WTRU registering over 3GPP or non-3GPP access, WTRU establishing a connection to a WLAN access, and/or the like. One or more (e.g., additional) conditions may be configured to update URSP rules and (re-)evaluate the validities. For example, the one or more (e.g., additional) conditionals may include: change of UPDN DNN availability, change of local UPDN instance availability, and/or the like. To support UPDN, PCF may monitor UPDN instances activated and deactivated by a WTRU. If a UPDN instance is activated on a WTRU, PCF may provide URSP rules related to the UPDN DNN to the WTRU. If a WTRU wishes to initiate a (e.g., new) connection, the WTRU may select a URSP rule and/or establish connection as described in FIG. 10.

Figure 10:
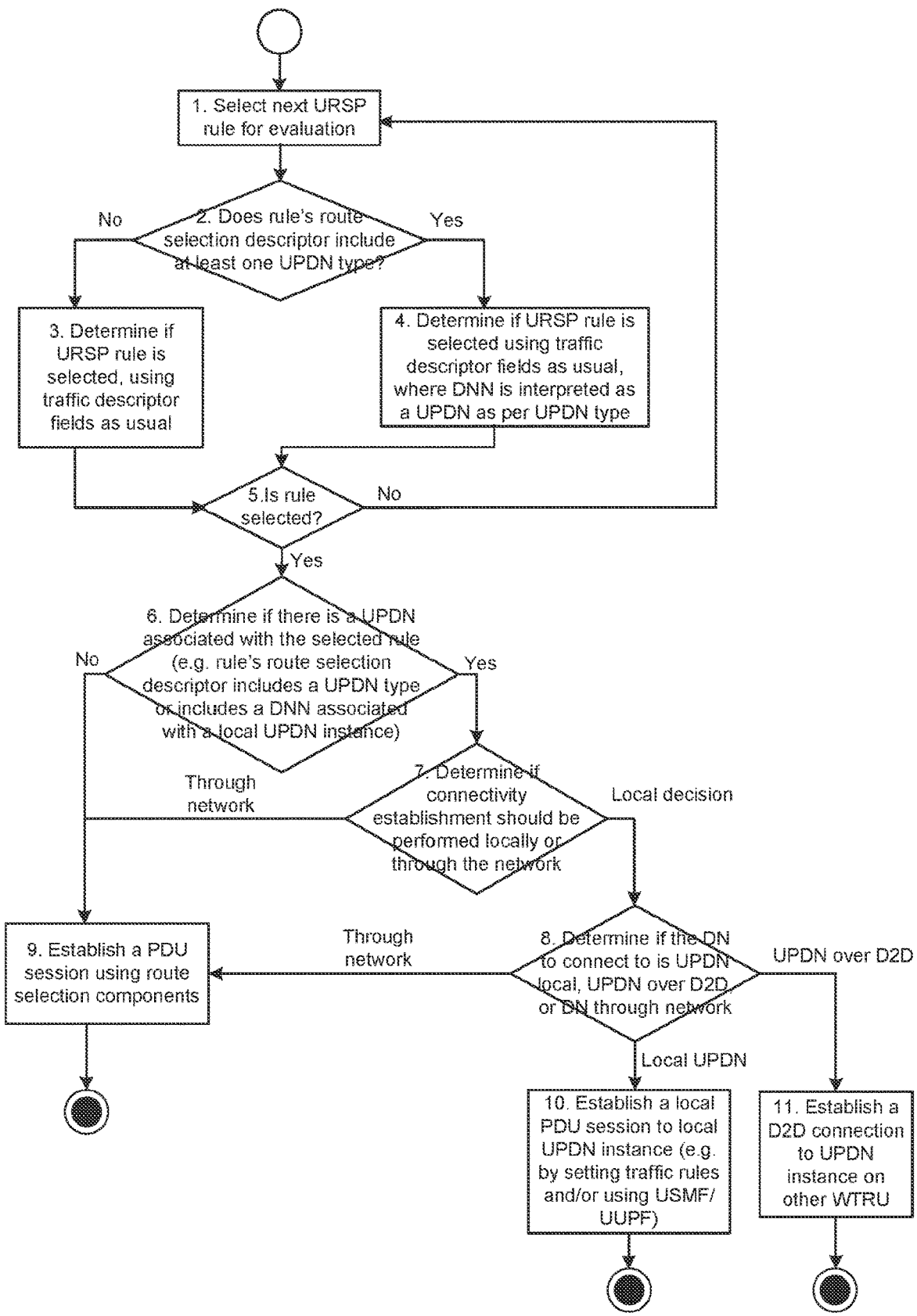
FIG. 10 illustrates an example of a WTRU establishing a UPDN communication based on one or more WTRU route selection policy (URSP) rules.

FIG. 10 illustrates an example of a WTRU establishing a UPDN communication based on one or more WTRU route selection policy (URSP) rules. The numbers shown in FIG. 10 may be presented for the purpose of reference. As such, the numbered actions may be performed in a different order (e.g., in whole or in part) and/or may be skipped.

As shown in FIG. 10, a WTRU may select a URSP rule. If one or more (e.g., all) information elements present in a traffic descriptor of a URSP rule are matched, the URSP rule may be selected. DNN, if present in a traffic descriptor, may identify a DN, which may be an in-network (e.g., an existing in-network) DN, hybrid DN, or UPDN. If a WTRU processes a traffic descriptor including a DNN, the DNN may be matched against DNN information provided by an application. A client application may be associated with configuration information including a DNN to use for communication. If used in a traffic descriptor in association with a DNN, UPDN type information may be matched against (e.g., additional) UPDN information provided by the application. For example, configuration information associated with a client application may include a flag indicating that DNN may/need/need not correspond to a local UPDN or a D2D UPDN. If application information matches DNN and UPDN type information (e.g., and/or matches other information element present in the traffic descriptor), a WTRU may select the URSP rule.

If a URSP rule is selected, a WTRU may determine if a route selection descriptor is associated with a UPDN (e.g., either the route selection descriptor has UPDN type information elements or has a DNN corresponding to a UPDN known by the WTRU, e.g., because the UPDN is hosted on the WTRU).

If the route selection descriptor is unassociated with a UPDN, selected URSP rule may be processed to establish a PDU session through the AMF.

If the route selection descriptor is associated with a UPDN, a WTRU may determine whether the connectivity is to be established locally or with support from a network. One or more UPDN-related information elements in UPDN profile, WTRU subscription profile, and/or local configuration, may be used by the WTRU to influence the choice (e.g., preference for using local control or in-network SMF illustrated in FIG. 11).

If a WTRU decides to use the network, selected URSP rule may be processed to establish a PDU session through the AMF. One or more UPDN-related fields may be added in the PDU session establishment, e.g., as will be described in FIGS. 17A-B.

A WTRU may interpret the route selection descriptor of the selected URSP rule. If used in the route selection descriptor, UPDN type information may provide information complementary to the DNN information element UPDN type, e.g., along with DNN, may identify a (e.g., specific) UPDN instance. For example, local UPDN allowed/needed information element (IE) may identify a local UPDN instance associated with DNN. For example, WTRU ID allowed/needed IE may identify, if a WTRU ID corresponds to the local ID, a local UPDN instance may be associated with DNN. For example, WTRU ID allowed/needed IE may identify, if a WTRU ID corresponds to other (e.g., a second) WTRU, a UPDN instance associated with DNN may be hosted by the other (e.g., the second) WTRU. For example, remote DN allowed/needed IE may identify an in-network DN. A WTRU may select a target DN/UPDN instance identified by a needed UPDN type, if any. If UPDN type has allowed types, the URSP rule may be used to establish communication with more than one DN/UPDN target instance. The WTRU may apply local logic to choose between the allowed UPDN target instances (e.g., based on a configured preference, local UPDN processing load, etc.).

WTRU may proceed with setting up a connectivity.

If selected UDPN is local, a WTRU may set up local connectivity to the UPDN (e.g., by setting up IP traffic rules on the WTRU, by configuring virtual routers on the WTRU, etc.). The WTRU may determine which IP rule to set, which virtual router to configure, etc., for example, based on local implementation and/or local configuration of UPDN. The local configuration of UPDN may be set during a UPDN software application installation and/or update on the WTRU.

If selected UDPN is a UPDN instance over D2D, a WTRU may initiate D2D connectivity towards a remote WTRU. The remote WTRU may be identified using a WTRU ID in UPDN type field of URSP rule. In (e.g., additional and/or alternative to) examples, a WTRU may use one or more policy rules (e.g., ProSe or URSP), e.g., to identify the remote WTRU based on the destination (e.g., IP) address of the connection.

If a WTRU decides to connect through a network, selected URSP rule may be processed to establish a PDU session through the AMF. One or more UPDN-related fields may be added in the PDU session establishment, as will be described in FIGS. 17A-B.

A WTRU, within a context of proximity services (ProSe), may use policy rules (e.g., URSP rules, ProSe rules), which may be configured on the WTRU and/or obtained from PCF. The policy rules may associate to a destination (e.g., IP) address and/or parameters to establish a side link connection to other WTRU associated with the address. The UPDN-related policy rules described herein may differ from D2D path selection policy for one or more of the following: UPDN-related policy rules may rely on DNN as a route selector; UPDN-related policy rules may target a UPDN hosted locally on a WTRU that is evaluating the policy rule; and/or UPDN-related policy rules may describe a D2D target UPDN in a general manner.

One or more UPDN-related policy rules may rely on DNN as a route selector. The one or more UPDN-related policy rules may establish connectivity to a data network through a WTRU, e.g., in addition and/or alternative to (e.g., as in D2D policy rules) establishing connectivity to an address on a WTRU.

UPDN-related policy rules may target (e.g., in addition to) an in-network DN or other WTRU over a side link and/or a UPDN hosted locally on the WTRU that is evaluating the policy rule.

UPDN-related policy rules may describe a D2D target UPDN in a general manner (e.g., a WTRU group ID or neighboring WTRU(s)). The WTRU may obtain detailed information on how to select an actual target WTRU from other rules, e.g., ProSe rules configured on the WTRU may associate the destination (e.g., IP) address with a specific WTRU ID.

A UPDN may be provisioned. A UPDN profile and UPDN in subscription profiles may be described herein. Access points (e.g., identified with DNAIs) between a DN and a (e.g., 5G) network may be configured in a (e.g., 5G) core network. UPDNs may be dynamic (e.g., more dynamic than DNs). The UPDNs may be hosted by WTRUs that may enter and leave a network. The UPDNs may be installed and removed from WTRUs over time. A registry of UPDNs may be maintained in the network, e.g., including identifiers, configuration, and/or status information. An (e.g., each) element of the registry a UPDN profile may be hosted on UDR. In (e.g., additional and/or alternative to) examples, WTRU subscription profiles may hold UPDN-related information.

A UPDN profile may be configured in a system (e.g., 5G system (5GS)) (e.g., in UDR). FIG. 11 illustrates an example UPDN profile. A UPDN profile may be configured by an (e.g., 5G) operator, e.g., using an input from a service provider (e.g., through a NEF/PCF API as described herein). A UPDN profile may include one or more information elements such as: a DNN, WTRU IDs or WTRU group IDs identifying WTRUs that are allowed to host an instance of UPDN (referred to herein as "UPDN providers," DNAI or DNAI prefix, a UPDN ID (e.g., a FQDN) that is used to (e.g., uniquely) identify a UPDN, a list of allowed (response disallowed) slide ID (e.g., S-NSSAI) for accessing this UPDN. Authentication/Authorization information for WTRUs that may be allowed to access an instance of this UPDN ("UPDN consumers"), or an explicit list of allowed UPDN consumers. A role of UPDN ID may enable cases where one or more UDPNs corresponding to the same DNN ID are provisioned, e.g., to replace an inactive UPDN with a (e.g., new) UPDN with the same DNN and different settings. In (e.g., additional and/or alternative to) example configuration fields, UPDN profile may include status information, such as IDs of WTRUs known to currently have an active UPDN or are known to host a UPDN. Status and configuration fields may be stored in a (e.g., separate) data structure (e.g., different UPDN profile and UPDN status data structures). A data structure grouping status and configuration described herein may be for UPDN profile and UPDN-related information elements in subscription profile.

UPDN information in subscription profile may be used to configure whether UPDNs are supported for a subscription and/or whether specific UPDNs are allowed or needed to be hosted on a WTRU. UPDN status (e.g., whether a UPDN instance is currently enabled or disabled) may be maintained in the subscription profile and/or (e.g., additionally and/or alternatively) be stored in a separate data structure (e.g., in UDR). FIG. 12 illustrates an example data network configuration information, such as UPDN information fields in a subscription profile.

Figure 13:
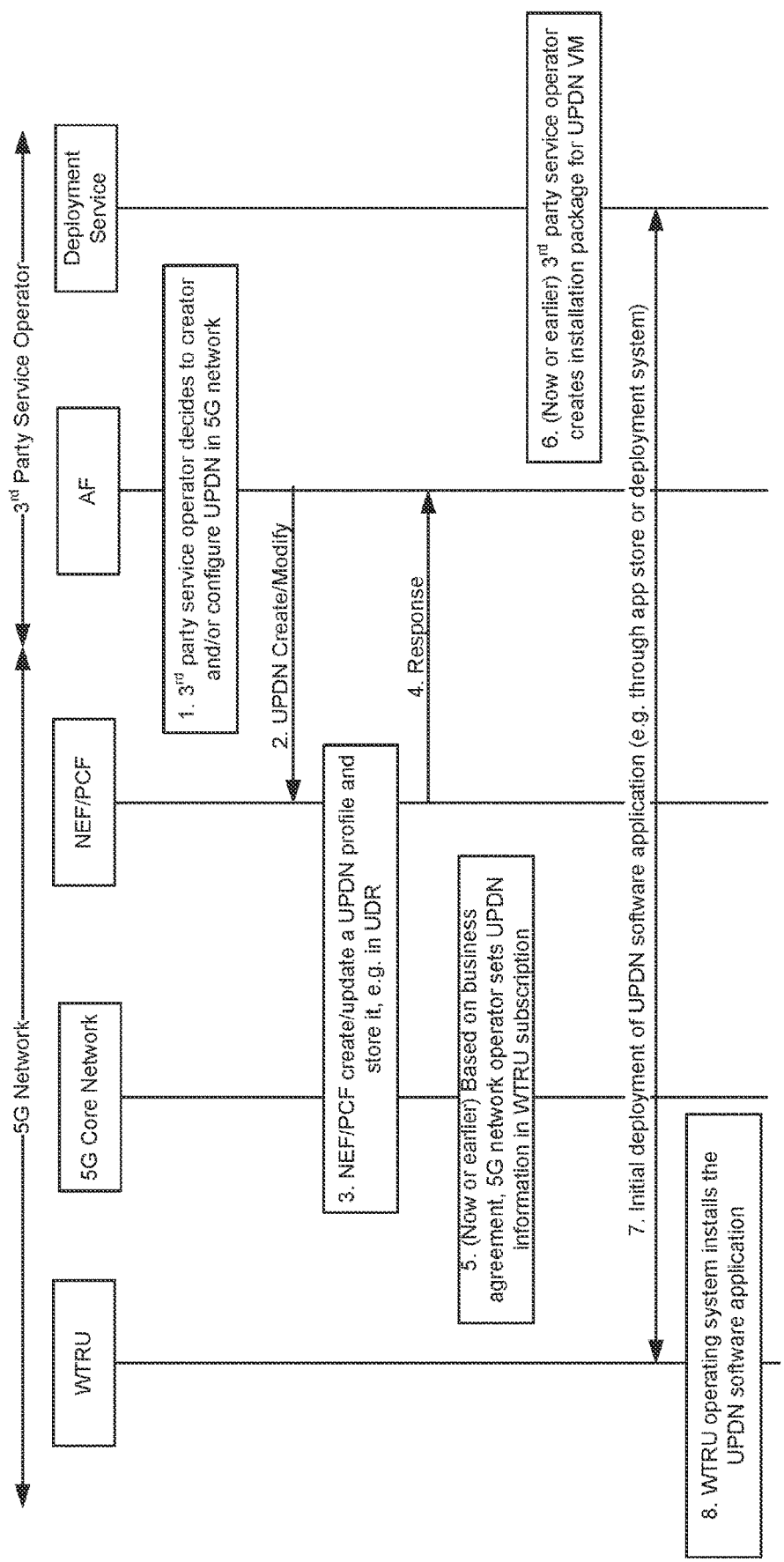
FIG. 13 illustrates an example UPDN provisioning in a network (e.g., a 5G network).

FIG. 13 illustrates an example UPDN provisioning in a network (e.g., a 5G network). The numbers shown in FIG. 13 may be presented for the purpose of reference. As such, the numbered actions may be performed in a different order (e.g., in whole or in part) and/or may be skipped.

A 3rd party service provider may provision a UPDN in a (e.g., 5G) network, e.g., using a UPDN management API implemented by NEF and/or PCF (e.g., as will be described in FIG. 14). If a UPDN is provisioned, the service provider may associate a DNN with the UPDN.

If a UPDN is created/updated using an API, NEF/PCF may create/update a UPDN profile described herein and may store the profile, e.g., in UDR.

Based on a level of service or a business contract, an (e.g., 5G) operator may configure UPDN support in WTRU subscription, e.g., including enabling UPDN, allowing/disallowing specific UPDNs, etc. The (e.g., 5G) network may configure UPDN-related information in WTRU subscription, e.g., as described in FIG. 12.

If a WTRU subscriber register for a service with the 3rd party service provider, an (e.g., 5G) operator may configure UPDN support in WTRU subscription as described herein.

A 3rd party service provider may package a UPDN software application and/or may make the UPDN software application available through an app store and/or through a deployment/management framework.

A WTRU subscriber(s) may download and/or install the UPDN application package. In (e.g., additional and/or alternative to) examples, the UPDN application package may be deployed on WTRUs using a managed deployment mechanism, e.g., using a protocol(s) such as an open mobile alliance device management protocol. A WTRU operating system may install a UPDN software application (e.g., installs a VM over its virtualization infrastructure).

UPDN management API (e.g., NEF and/or PCF) may expose an (e.g., REST) API to provision, delete, and/or update UPDNs in a (e.g., 5G) network, as described in FIG. 14. FIG. 14 illustrates an example operation of an application programming interface (API) for a WTRU provided data network, such as a UPDN.

UPDN PDU may provide connectivity support. PDU connectivity support and/or an example implementation of PDU session establishment for local or D2D connections to UPDNs may be considered. For example, local/D2D connections to UPDNs may be enabled to be managed by a (e.g., 5G) core network. One or more features of a (e.g., 5G) network, e.g., such as session continuity, accounting, and/or charging, may be used for UPDN connectivity.

A local software SMF component (e.g., WTRU-hosted session management function (USMF)) may be present on a WTRU. USMF may control PDU session establishment to a UPDN instance, e.g., in a role of a SMF or an I-SMF (e.g., actual session management or acting as a proxy for an in-network SMF). In (e.g., additional and/or alternative to) examples, USMF may select and/or configure WTRU-hosted user plane function (UUPF). In (e.g., additional and/or alternative to) examples, USMF may enable session transfer between USMF and SMF. USMF may be on a WTRU, a component on the WTRU (e.g., a part of (e.g., 5G) WTRU control function) may select whether (e.g., or not) to use USMF for a given PDU session. Other local software UPF component (e.g., UUPF) may be present on a WTRU. UUPF may be a data plane entity that has the role of a UPF on a PDU session between the WTRU and UPDN (e.g., UUPF may be an IP router, Ethernet switch, or other gateway, depending on the PDU session type). In (e.g., additional and/or alternative to) examples, UUPF may perform traffic accounting for billing and/or SLA enforcement and verification. In a setup, a USMF per WTRU and a UUPF per UPDN instance on the WTRU may exist USMF may enable on-demand UPDNs by starting/stopping UPDN instances and UUPFs, e.g., if needed. UPDN instances and UUPFs may (e.g., additionally and/or alternatively) be started by a WTRU, e.g., at WTRU startup or network registration time.

Figure 15:
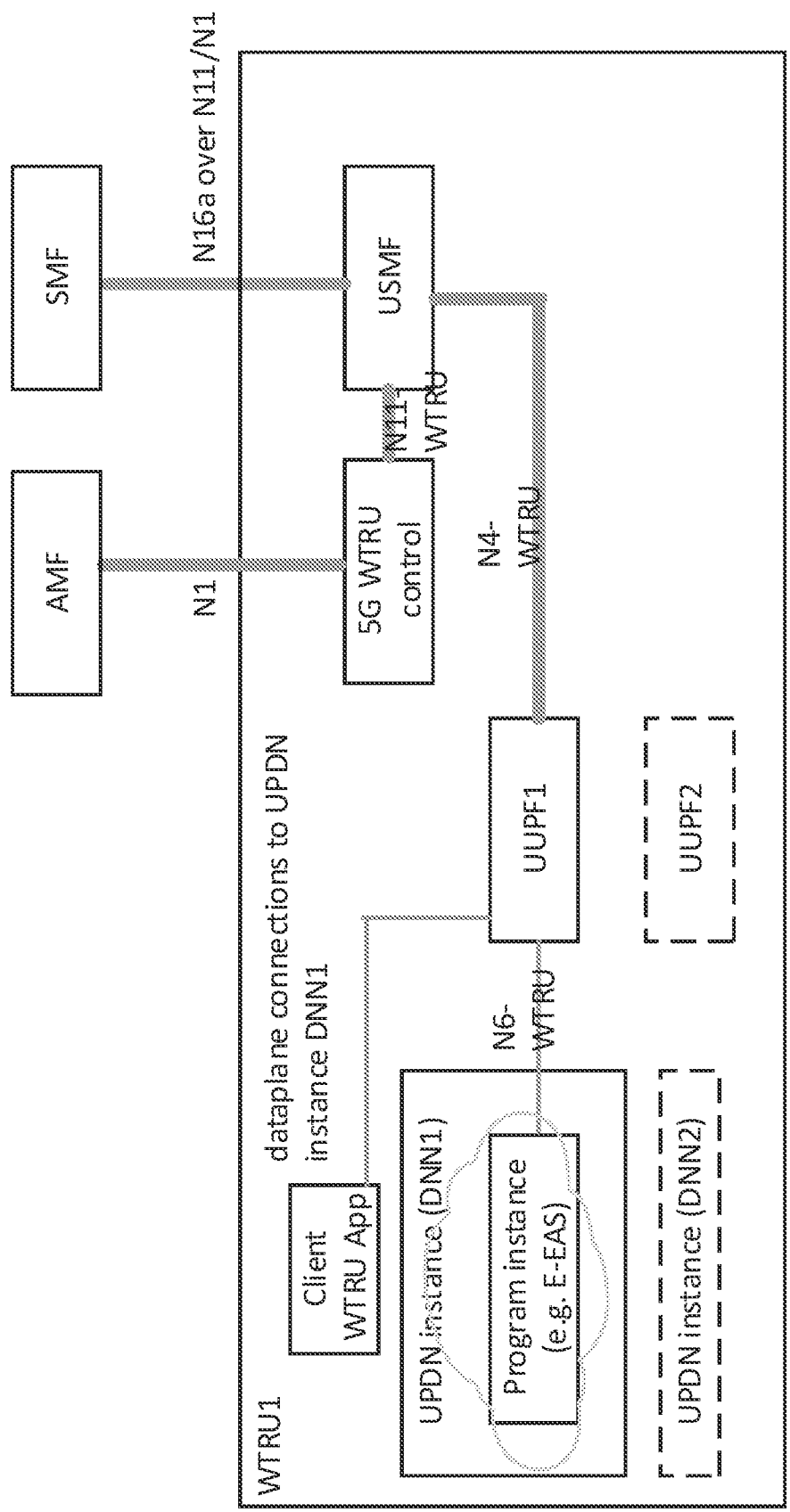
FIG. 15 illustrates an example WTRU that may include and/or provide a WTRU-hosted session management function (USMF) and/or a WTRU-hosted user plane function (UUPF).

FIG. 15 illustrates an example WTRU that may include and/or provide a WTRU-hosted session management function (USMF) and/or a WTRU-hosted user plane function (UUPF). For example, as illustrated in FIG. 15, local connectivity may be established using UUPF and USMF. N6-WTRU, N4-WTRU, and/or N11-WTRU may be reference points that are in-WTRU equivalent and/or simplified versions of N6, N4, and/or N11 5G reference points.

Figure 16:
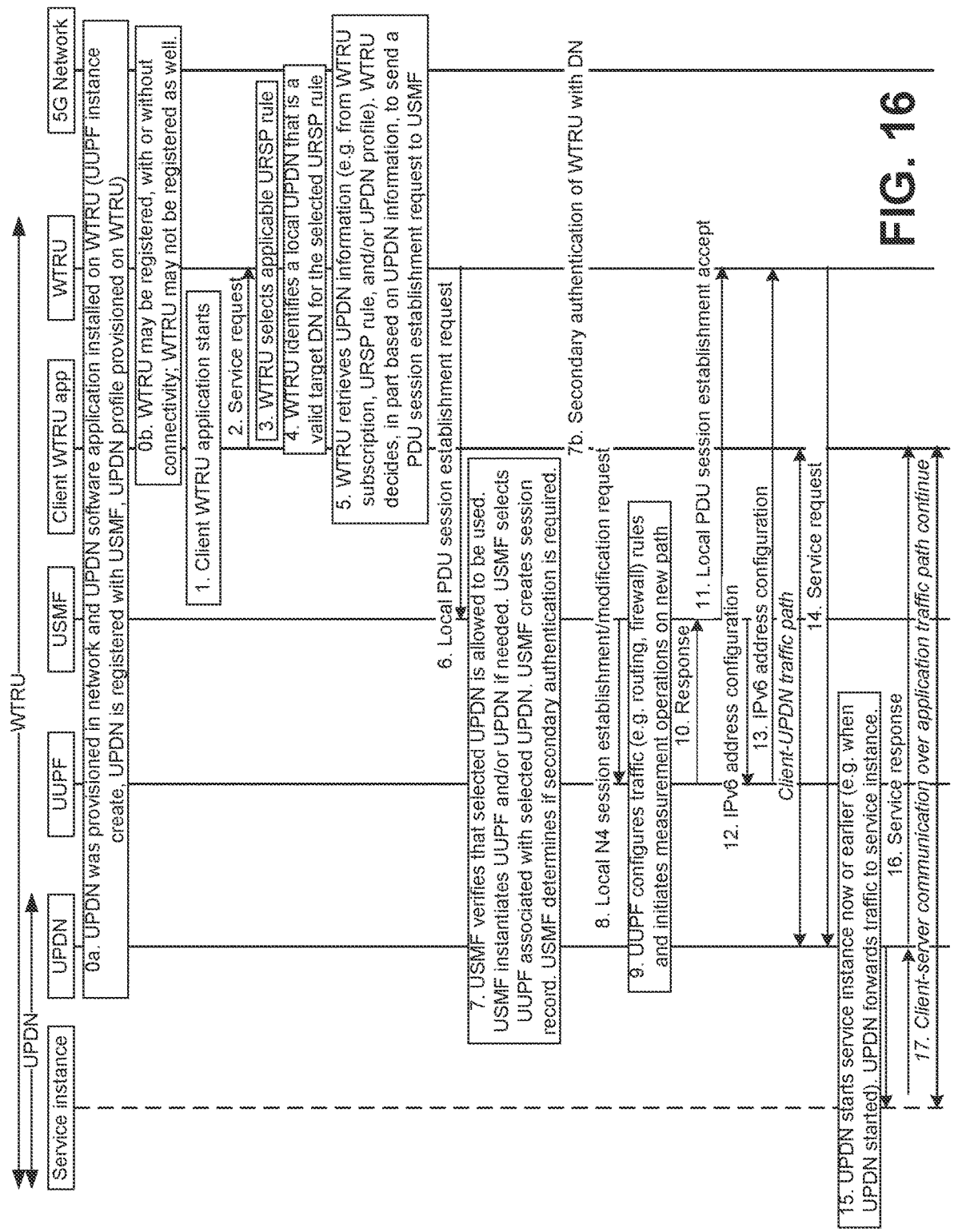
FIG. 16 illustrates examples for establishing a session, such as a packet data unit (PDU) session, with a WTRU provided data network, such as a UPDN.

FIG. 16 illustrates examples for establishing a session, such as a packet data unit (PDU) session, with a WTRU provided data network, such as a UPDN. The numbers shown in FIG. 16 may be presented for the purpose of reference. As such, the numbered actions may be performed in a different order (e.g., in whole or in part) and/or may be skipped. For example, FIG. 16 illustrates initiating communication between a client WTRU application and a service instance in a local UPDN instance, e.g., using USMF to locally control the session (e.g., if a WTRU is temporarily disconnected from the network).

UPDN may be provisioned in a network and/or a UPDN software application may be installed on a WTRU. UUPF instance may be created and/or may be associated with UPDN instance. UUPF/UPDN may be registered with USMF. UPDN profile may be obtained by a WTRU from a network, e.g., from UDR. A WTRU may start UPDN instance and/or UUPF or additionally and/or alternatively USMF may start UPDN instance and/or UUPF if needed (e.g., if UPDN instance and/or corresponding UUPF were activated by a WTRU and were not started).

A WTRU may be registered or not registered with a network. If a WTRU is registered, the WTRU may be able to access the network or not (e.g., due to a localized lack of coverage).

A client WTRU application may start. A client WTRU may send a service request, e.g., a DNS request for application1.edge.service.com.

A WTRU may look up one or more URSP rules and/or may select an applicable URSP rule (e.g., as illustrated in FIG. 10).

A WTRU may identify a local UPDN that is a valid target DN for the selected URSP rule. For example, applicable URSP rule may include a DNN in a traffic descriptor (e.g., that is associated with a locally present DNN).

A WTRU may retrieve UPDN information (e.g., from WTRU subscription, URSP rule, and/or UPDN profile). A WTRU may decide, e.g., in part based on UPDN information, to send a PDU session establishment request to USMF (e.g., establishing a local PDU session to local UPDN instance as illustrated in FIG. 10).

A WTRU may send a local PDU session establishment request to USMF. The PDU session establishment request message may include the same parameters as a PDU session establishment request message (e.g., sent to in-network SMF). The request message may include S-NSSAI(s), requested DNN, PDU session ID, requested PDU session type, requested SCC mode, etc. In (e.g., additional and/or alternative to) examples, one or more parameters may be omitted from the request. For example, one or more parameters that relate to features not or less useful in a local context, such as header compression configuration parameters, a PDU session requested, etc. may be omitted from the request.

A WTRU may set local firewall and routing rules to enable user plane traffic between a client WTRU application and UUPF (e.g., over the N3-WTRU interface).

USMF may verify that connecting to selected UPDN (e.g., identified using DNN in local PDU session establishment) may be allowed (e.g., UPDN instance for the DNN has been registered with USMF and is active).

USMF may select UUPF associated with a selected UPDN (e.g., on a 1-1 relationship between UUPF and UPDN, 1-to-many, or using a UUPF per WTRU). USMF may create a session record for the PDU session. USMF may instantiate (e.g., start) UUPF and/or UPDN, if needed. If a UPDN software application starts, internal UPDN programs (e.g., operating system, DNS server, EES, etc.) may start.

USMF may determine if secondary authentication/authorization is needed, e.g., to authorize a WTRU to access UPDN DNN. The determination may be based on information elements in local configuration (e.g., setup if a UPDN software application was installed) or on information from a network (e.g., WTRU subscription profile, UPDN profile, etc.). Information elements used may include one or more of the following: authentication/authorization flag, DN-AAA server(s) address(es), and/or DNN where DN-AAA servers are location, if different from UPDN DNN.

If an operation is unable to be performed by a USMF (e.g., UPDN software application image not running and/or not present or other errors), the USMF may respond to a WTRU with a negative status. A WTRU may proceed with registering with a (e.g., 5G) network (e.g., if the registration is not already done) and/or sending a PDU session establishment request to the AMF (e.g., as described in FIGS. 17A-B).

If USMF decides to perform secondary authentication of WTRU, secondary authentication of WTRU with DN may be performed (e.g., as usual for PDU session establishment). A service provider/DN-AAA may authorize the WTRU to access a given DNN (e.g., DNN associated with URSP instance). In (e.g., additional and/or alternative to) examples, a local authorization may be used, e.g., based on authentication rules installed on the WTRU, including a list of the client applications allowed to connect to the UPDN instance.

USMF may send a local UPF configuration command to UUPF, e.g., in a local N4 session establishment or modification message. For example, a modification message may be used if a N4 session has been established between USMF and UUPF.

A local N4 session establishment/modification message may include (e.g., the same) information elements as a N4 session establishment/modification message sent by SMF to UPF and/or may use a (e.g., similar) protocol (e.g., packet forwarding control protocol (PFCP)). Information elements provided by SMF to UPF may include one or more of DNN (e.g., which may be used by UUPF to identify UPDN instance to connect to, based on information configured on a WTRU if a UPDN software application was installed), PDU session type (e.g., IPv4 or IPv6) based on a WTRU request, traffic detection information, forwarding action rules, application ID, minimum/guaranteed bit rates, precedence, or etc.

UUPF may configure traffic (e.g., routing, firewall, and/or the like) rules and may initiate measurement operations on a (e.g., new) path. UUPF may send a local UPF configuration response to USMF. USMF may send a local PDU session establishment accept to a WTRU.

USMF may provide a WTRU with an IPv4 and/or IPv6 address allocation and/or parameter configuration for the PDU Session. For example, USMF may provide an IP address and/or parameter configuration via DHCPv4 or stateless DHCPv6. USMF may allocate an IPv6 prefix for IPv6 stateless auto-configuration by a WTRU, e.g., using a router advertisement sent through UUPF. In examples, USMF may send a router advertisement to a WTRU through UUPF, e.g., for IPv6 address configuration.

The traffic path between a client WTRU application and the UPDN may be set up. A WTRU may forward towards UPDN the service request originated from a client WTRU app. Service instance may have been started if UPDN started. Additionally or alternatively, UPDN may start the service instance now. UPDN may forward the service request to the service instance (e.g., E-EAS) inside the UPDN. The service instance may send a reply to the client WTRU. The traffic path between a client WTRU application, and the service instance in UPDN may be set up.

Figure 17A:
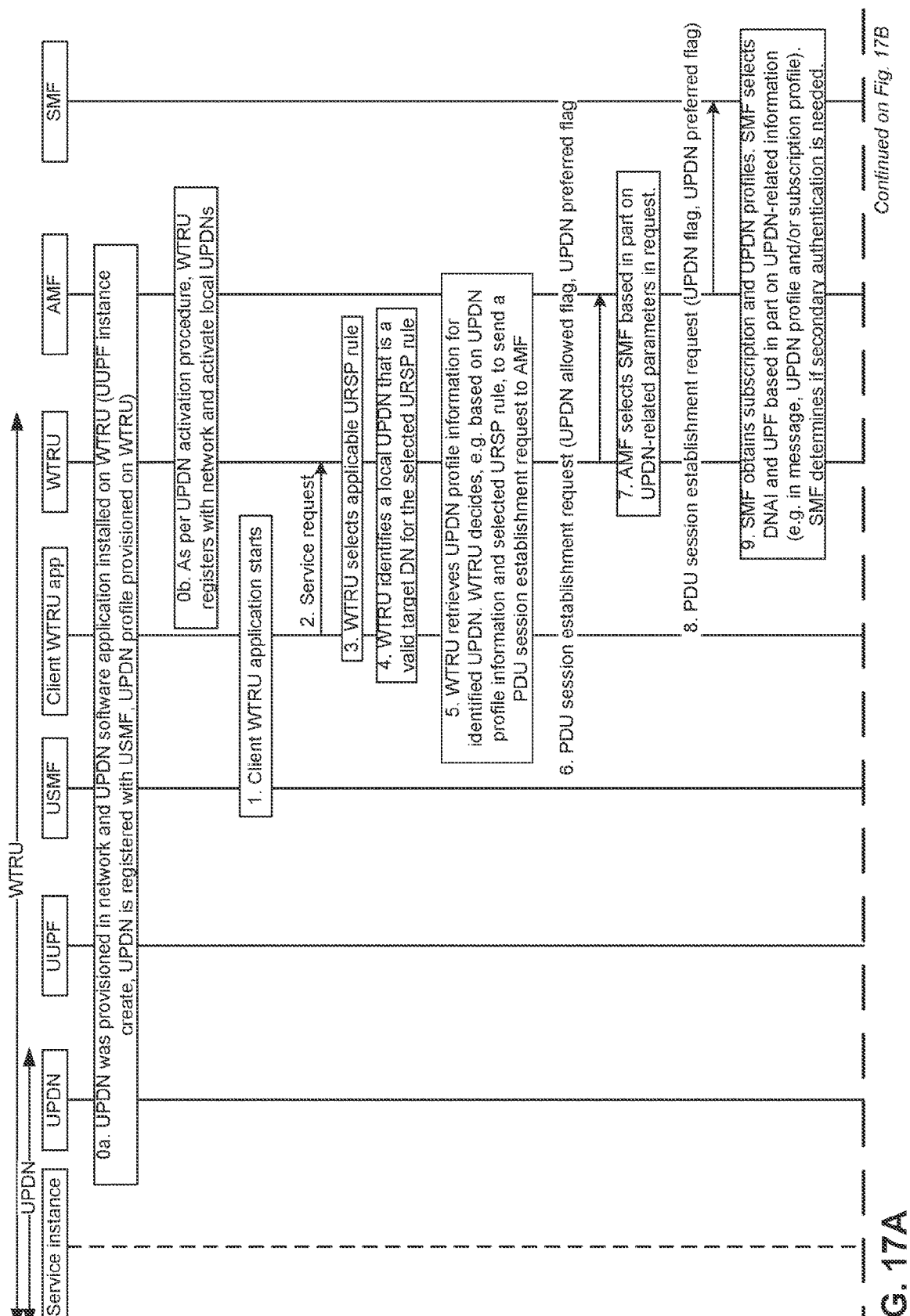

FIGS. 17A-B illustrates an example for establishing a session, such as a PDU session, with a WTRU provided data network, such as a UPDN instance. The numbers shown in FIGS. 17A-B may be presented for the purpose of reference. As such, the numbered actions may be performed in a different order (e.g., in whole or in part) and/or may be skipped. For example, FIGS. 17A-B may indicate communication between a client WTRU application and a service instance in a local UPDN, e.g., using an in-network SMF to control the session.

UPDN may be provisioned in a network and/or a UPDN software application may be installed on a WTRU (e.g., as illustrated in FIG. 16). A WTRU may register with a network and/or may activate local UPDNs as described in FIG. 7.

One or more of the following may occur a client WTRU application may start; the client WTRU application may send a service request (e.g., to a WTRU); a WTRU may select a URSP rule; and/or a WTRU may retrieve UPDN information (e.g., as illustrated in FIG. 16).

A WTRU may retrieve UPDN information (e.g., from WTRU subscription, URSP rule, and/or UPDN profile). In examples, a WTRU may decide, e.g., in part based on UPDN information, to send a session request message (e.g., PDU session establishment request) to a network client (e.g., client WTRU, WTRU2, in-network SMF, etc.) if network information associated with the first network (e.g., UPDN) satisfies one or more criteria. The one or more criteria may be that the network client has a subscription associated with the first network (e.g., UPDN), and/or may be that some attributes of the connection of WTRU or WTRU2 with the network reach a threshold (e.g., the signal quality, packet loss, and/or lag time). The session request message may indicate a request to establish a data session (e.g., PDU session) using the first network (e.g., UPDN).

In examples, based on a determination that connectivity establishment is performed locally or through a network (e.g., as shown in FIG. 10), a WTRU may decide to let a network decide to use in-network DN or UPDN. In (e.g., additional and/or alternative to) examples, based on a determination that if a UPDN associated with a selected rule exists (e.g., as shown in FIG. 8), a WTRU may not be aware that a DN is hybrid and/or may use a PDU session establishment. In examples, a WTRU may decide, e.g., in part based on UPDN information, to send a session request message (e.g., PDU session establishment request) to a second network (e.g., AMF) if network information associated with the first network (e.g., UPDN) satisfies one or more criteria. The one or more criteria may be that the network client has a subscription associated with the first network (e.g., UPDN), and/or may be that some attributes of the connection of WTRU or WTRU2 with the network reach a threshold (e.g., the signal quality, packet loss, and/or lag time). The session request message may indicate a request to establish a data session (e.g., PDU session) using the first network (e.g., UPDN). The WTRU may receive a session request response from the second network (e.g., AMF). In examples, the session request response may indicate that the WTRU can establish the data session (e.g., PDU session) with the network client (e.g., client WTRU, WTRU2, in-network SMF, etc.) using the first network (e.g., UPDN).

In examples, the WTRU may receive a session request message from the second network (e.g., AMF). The session request message may indicate a request to establish the data session (e.g., PDU session) with the network client (e.g., client WTRU, WTRU2, in-network SMF, etc.) using an existing PDU session. The session request message may indicate an identity of the network client (e.g., client WTRU, WTRU2, in-network SMF, etc.) and indicate the network name associated with the first network (e.g., UPDN). The WTRU may send a session request message to the second network (e.g., AMF). The session request message may indicate a request to establish the data session with the network client (e.g., client WTRU, WTRU2, in-network SMF, etc.) using the first network (e.g., UPDN). The WTRU may receive a session request response from the second network (e.g., AMF). The session request response may indicate that the WTRU can establish the data session (e.g., the PDU session) with the network client (e.g., client WTRU, WTRU2, in-network SMF, etc.) using the first network (e.g., UPDN).

A WTRU may send a PDU session establishment request to AMF and/or may send UPDN-related information elements. The WTRU may send an authentication request to the second network (e.g., AMF) if it determined the data session (e.g., PDU session) is to be established using the first network (e.g., UPDN). The authentication request may indicate a request an identity associated with the network client to be authenticated. For example, the UPDN-related information elements may include UPDN allowed flag and/or UPDN preferred flag (e.g., if the WTRU is aware that the DNN corresponds to DN including UPDN instances). The parameters may be used to override a behavior configured for the UPDN (e.g., through UPDN profile or WTRU subscription profile) and/or may be omitted if the value matches a preconfigured (e.g., default) value.

If a UPDN allowed flag is set, the UPDN allowed flag may indicate that a WTRU allows a UPDN instance to be selected by SMF.

If a UPDN preferred flag is set, the UPDN preferred flag may indicate that a WTRU prefers UPDN to be selected by SMF (e.g., rather than an in-network DNAI).

AMF may select SMF based (e.g., in part) on UPDN-related parameters (e.g., from PDU session establishment request, UPDN profile, WTRU subscription, and/or WTRU registration message). For example, if the PDU establishment request includes a DNN that has a local activated UPDN instance on a WTRU, the AMF may select a SMF that supports local UDPNs.

AMF may forward PDU session establishment request message to selected SMF.

SMF may obtain WTRU subscription and/or UDPN profiles (if the WTRU subscription and/or UDPN profiles are not present locally on the SMF). SMF may select DNAI/ WTRU and/or UPF/UUPF based (e.g., in part) on UPDN-related information (e.g., in PDU session establishment message, UPDN profile, and/or WTRU subscription profile). In examples, SMF may select DNAI corresponding to a UPDN instance on a WTRU. SMF may determine if secondary authentication/authorization is needed (e.g., based on local configuration or USMF verifying that selected UPDN is allowed to be used as illustrated in FIG. 16).

If determined by SMF, secondary authentication of WTRU with DN may be performed (e.g., as PDU session establishment). A service provider/DN-AAA may authorize a WTRU to access a given DNN (e.g., DNN associated with URSP instance). DN-AAA may not be illustrated in FIGS. 17A-B (e.g., for simplicity).

SMF may send a N4 information message to USMF through AMF and a WTRU (e.g., over N11 and N1 interfaces), e.g., regarding how the traffic may be detected, enforced, and/or monitored in UUPF, e.g., using a PFCP message, e.g., defined for N16a interface. Acting as an I-SMF, USMF may translate the N4 information into an appropriate N4 rule(s) for UUPF and/or may send a N4 session establishment/modification request to UUPF. N4 information message from SMF to USMF may include parameters (e.g., WTRU ID, DNN, etc.). WTRU ID may be used by AMF, e.g., to determine towards which WTRU to forward the request DNN may be used by USMF to determine towards which UUPF instance may send the N4 session establishment/modification request.

One or more of the following may occur USMF may send local N4 session establishment/modification request to UUPF; UUPF may configure traffic rules and/or initiate measurement operations on a path; UUPF may send a response to USMF; and/or USMF may send a local PDU session establishment accept message to a WTRU (e.g., as shown in FIG. 16).

USMF may send a response back to SMF.

SMF may send a PDU session establishment accept back to a WTRU.

Figure 18A:
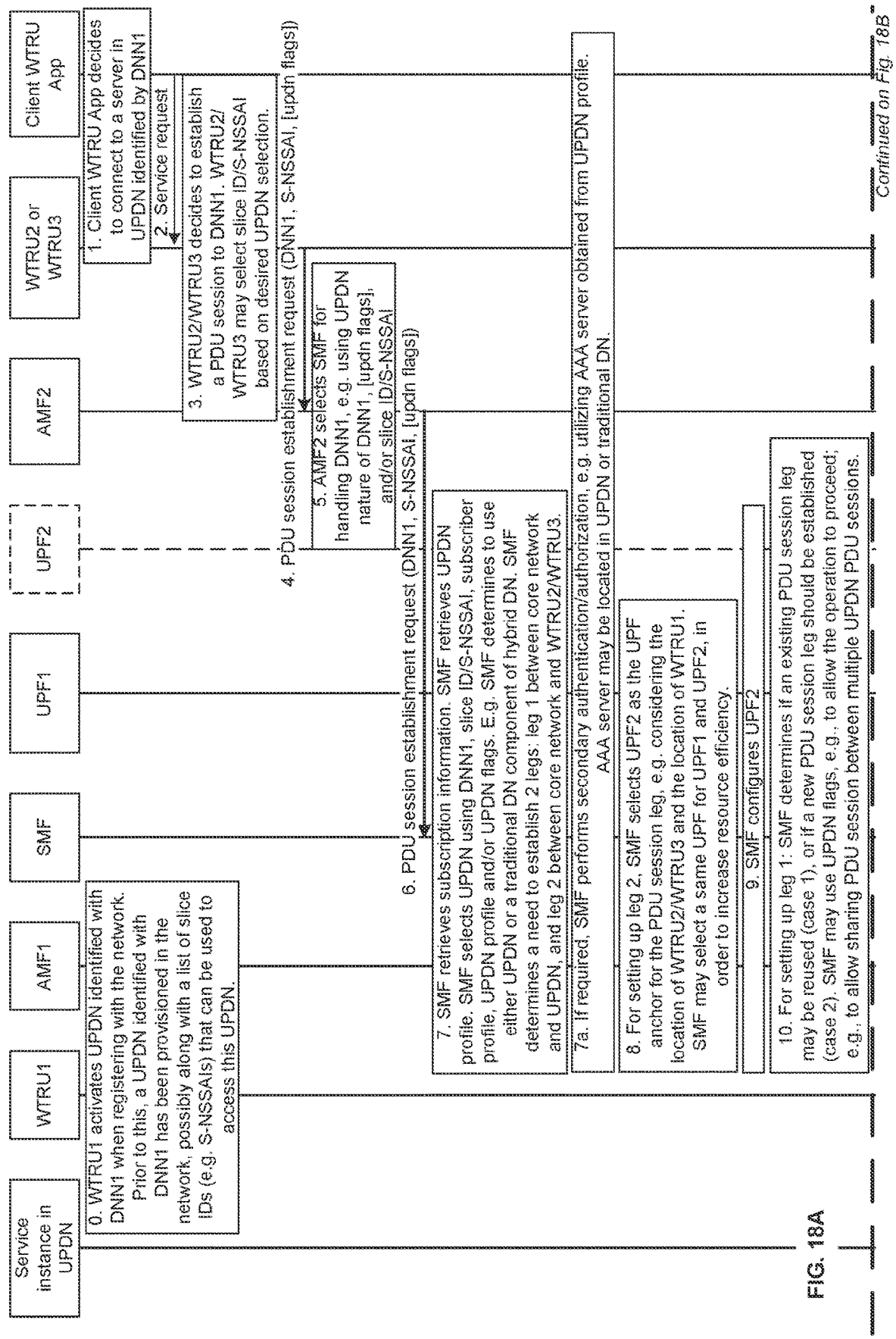
FIGS. 18A-Bs illustrate an example of a session establishment, such as a PDU session establishment procedure, for a WTRU provided data network, such as a UPDN.

FIGS. 18A-B illustrates an example of a session establishment, such as a PDU session establishment procedure, for a WTRU provided data network, such as a UPDN. FIGS. 18A-B may relate to a procedure where a client application inside a WTRU may trigger the establishment of a UPDN PDU session to communicate with a UPDN provided by another WTRU, e.g., through the 5G network. The network elements present in the procedure were introduced previously herein. WTRU2 or WTRU3 (hereby identified as WTRU2/WTRU3) may be initiating a UPDN PDU connection to a UPDN. A UPDN PDU session establishment between WTRU2/WTRU3 and WTRU1 may set up the network (e.g., 5G network) as a router between the UPDN domain/IP subnet(s) and WTRU2/WTRU3. In examples, if a client WTRU application on WTRU2 or WTRU3 initiates communication with a server in a UPDN, WTRU2/WTRU3 may initiate a PDU session targeting the UPDN DNN1. The network (e.g., 5G network, SMF) may determine that the connection targets a UPDN provided by WTRU1, then SW may select UPF1 and UPF2, and may establish 2 legs: leg 1 between WTRU1 and UPF1, and leg 2 between WTRU2 and UPF2. SMF may (e.g., may also) configure forwarding between the 2 legs. Each leg may be individually similar to a usual PDU session between a WTRU and an anchor UPF. If the UPDN PDU session is established, the client WTRU application on WTRU2 may communicate with a service instance in the DNN1 UPDN provided by WTRU1.

In examples, slice IDs/S-NSSAI may be used to influence the selection, by the network, of a UPDN or UPDN component. In examples, WTRUs may provide UPDN flags information elements to the network, to influence its behavior as described herein.

In 0, a UPDN identified as DNN1 may be provisioned in the network, possibly along with a list of slice IDs (e.g., S-NSSAI) that may be used to access this UPDN. WTRU1 may activate UPDN identified with DNN1 when registering with the network.

In 1, a client WTRU application may decide to connect to a server, which may be located in a UPDN identified by DNN1.

In 2, the client WTRU application may send a service request (e.g., sends a DNS request, opens a socket, and/or sends an initial data packet to a server in DNN1).

In 3, e.g., based on the service request from 2, WTRU2/WTRU3 may decide to establish a PDU session to DNN1. WTRU2/WTRU3 may select DNN1 as usual, e.g., using local WTRU policy such as URSP rules. DNN1 may be known by WTRU2/WTRU3 as explicitly identifying a UPDN, or not WTRU2/WTRU3 may decide to influence the selection of a UPDN for DNN1, e.g.: WTRU2/WTRU3 may select a slice ID/S-NSSAI based on a desired UPDN selection. In examples, WTRU2/WTRU3 may select a S-NSSAI known to allow or disallow the selection, by the network, of a DNAI corresponding to a UPDN instance over the selection of a DNAI corresponding to a N-UPDN. WTRU2/WTRU3 may (e.g., may also) select a S-NSSAI known to forbid UPDN selection by the network, or to request UPDN selection by the network. Available S-NSSAIs may be obtained, e.g., from UPDN profile (e.g., configured by the network on WTRU2/WTRU3 through policy configuration). In examples, WTRU2/WTRU3 may select a combination of UPDN flags (e.g., "UPDN allowed", "UPDN preferred", "UPDN not allowed") to influence the UDPN selection by the network. WTRU2/WTRU3 may use one or more criteria to determine its decision to influence network behavior to select a UPDN or UPDN component. The one or more criteria may be that the network client has a subscription associated with the first network (e.g., UPDN), and/or may be that some attributes of the connection of WTRU or WTRU2 with the network reach a threshold (e.g., the signal quality, packet loss, and/or lag time).

In 4, WTRU2/WTRU3 may send a PDU session establishment request including DNN1. The request may (e.g., may also) include a S-NSSAI selected in 3, and/or UPDN flags selected in 3.

In 5, if the PDU establishment request message is received, AMF2 may obtain the WTRU subscription and/or UPDN profile. AMF2 may select SMF for handling DNN1 (e.g., based on local configuration or UPDN profile corresponding to DNN1 and/or using UPDN flags or slice ID/S-NSSAI from the PDU session establishment message).

In 6, AMF2 may send a PDU session establishment request (DNN1, S-NSSAI, [UPDN flags]) to SMF.

In 7. SMF may retrieve WTRU subscription information. SMF may retrieve UPDN profile and UPDN status information (e.g., from UPDN profile). UPDN status may include whether a UPDN is currently activated by one or more UDPN provider WTRUs (e.g., WTRU1). SMF may retrieve information about UDPN provider WTRUs, such as reachability and location. SMF may select UPDN using DNN1, slice ID/S-NSSAI, subscriber profile, UPDN profile, UDPN status, UPDN provider WTRU reachability, location and connection signal quality, packet loss, lag time, and/or UPDN flags. In examples, SMF may determine to use either UPDN or a N-UPDN component of hybrid DN. SMF may determine a need to establish 2 legs: leg 1 between the core network and UPDN, and leg 2 between the core network and WTRU2/WTRU3.

In 7a, if requested (e.g., by network policy or UPDN profile), SMF may perform secondary authentication/authorization, e.g., utilizing AAA server obtained from UPDN profile. AAA server may be located in a UPDN instance (e.g., on WTRU1), or a N-UPDN (e.g., a N-UPDN section of DNN1), or the core network (e.g., an application server in the core network).

The following processes may setup leg 1, leg 2 and leg1-leg2 communication. Each setup phase (leg 1, leg 2 and leg1-leg2) may be performed in a different order or concurrently, although there are here represented in sequence for simplicity. Each leg may be established, updated, and released using procedures based on the existing PDU session establishment/update/release procedures. Changes to those existing procedures, e.g., additional logic and information elements, are described herein.

In 8, for setting up leg 2, SMF may select UPF2 as the UPF anchor for the PDU session leg 2, e.g., considering the location of WTRU2/WTRU3 and the location of WTRU1. SMF may select a same UPF for UPF1 and UPF2, in order to increase resource efficiency.

In 9, SMF may configure UPF2 with traffic rules to accept and forward traffic to/from WTRU2/WTRU3, and/or to/from UPDN IP subnet(s).

In 10, for setting up leg 1, SMF may determine if an existing PDU session leg 1 may be reused (case 1), or if a new PDU session leg 1 should be established (case 2). SMF may use UPDN flags and/or network policy and/or UPDN profile, to decide whether it allows the operation to proceed, and/or to allow sharing a leg 1 between multiple UPDN PDU session.

In case 1, covered by 11-1 and 12-1, SMF may use an existing leg 1 to carry traffic for the new UPDN PDU session:

In 11-1, SMF may select an existing PDU session leg 1, e.g., established in an earlier UPDN PDU session establishment procedure. In examples, an existing leg 1 was previously set up using case 2 of the present procedure and was associated by WTRU1 to UPDN flags that enable sharing this leg 1. In examples, SMF may decide to share an existing leg 1 based on network policy and/or UPDN profile.

In 12-1, SMF may trigger a PDU session modification to enable WTRU2/WTRU3-UPDN traffic, e.g., by enabling new flows, over the selected existing PDU session leg 1. This procedure involves the UPF of the existing PDU session (UPF1).

In case 2, covered by 11-2 to 12f-2, SMF may trigger the establishment of a new leg 1 to carry traffic for the new UPDN PDU session:

In 11-2, SMF may send a trigger message to WTRU1 (e.g., UPDN management app, DNN1). In examples, SMF may use an SMS-based application triggering procedure. The identifier of a UPDN management application (or UPDN management software component) on WTRU1 may be provided as target parameter of the trigger. DNN1 may (e.g., may also) be provided as a parameter to the bigger.

In 12a-2, the UPDN management app may request service from the network. In examples, the UPDN management app may use a programmatic API to trigger the establishment, by the WTRU, of a PDU session associated with DNN1.

In 12b-2, the WTRU may send a PDU session establishment request (DNN1, [UPDN flags]) for leg 1. WTRU1 may influence future sharing of leg 1 using UPDN flags such as: "always share leg 1", "never share leg 1", "may share leg 1". WTRU1 may (e.g., may also) omit UPDN flags and not influence future sharing of leg 1. In examples, the network may (e.g., may later) decide whether to share leg 1 or not, e.g., based on network policy and/or UPDN profile.

In 12c-2, SMF may select UPF1 as an anchor UPF for PDU session leg 1, e.g., based on the location of WTRU1 and/or WTRU2/WTRU3. SMF may select a same UPF for UPF1 and UPF2, in order to increase resource efficiency.

In 12d-2, if UPDN flags were provided in the request, SMF may store the UPDN flags, e.g., to be used in future decisions to share this PDU session leg 1 with other UPDN PDU sessions.

In 12e-2, SMF may configure UPF1, e.g., with traffic rules to accept and forward traffic to/from WTRU2/WTRU3, and/or to/from UPDN IP subnet(s).

In 12f-2, SMF may send a PDU session establishment accept towards WTRU2/WTRU3 through AMF2. Leg 1 setup may complete similarly to a PDU (e.g., traditional PDU) session establishment.

In 13, SMF may configure UPF1 and UPF2 (and any needed intermediate devices/UPFs/routers) for forwarding traffic between leg 1 and leg 2, e.g., by setting up traffic filters with WTRU2/WTRU3 IP address as an allowed source and destination IP address. In a case where UPF1 and UPF2 are different NFs, traffic between leg 1 and leg 2 may be transported over a tunnel (e.g., a GTP tunnel similar to a N19 interface). In a case where UPF1 and UPF2 are a same NF, traffic between leg 1 and leg 2 may be transported internally using a local switch functionality in UPF1/UPF2.

In 14, WTRU1 may configure its own networking stack, e.g., a local virtual router, to route traffic between the IP subnet(s) in the UPDN instance hosted by WTRU1 and, through the UPDN PDU session, WTRU2/WTRU3.

In 15a and 15b, SMF may send a PDU session establishment accept towards WTRU1 through AMF1. Leg 1 setup may complete as usual for a PDU (e.g., traditional PDU) session establishment, including sending, by SMF, a router advertisement to WTRU2/WTRU3 in the case of an IPv6 PDU establishment. Router advertisement(s) may be used to allocate an IP prefix to WTRU2/WTRU3 and advertise the UPDN subnet(s) that are reachable through this PDU session.

The network (e.g., 5G network) may behave (e.g., from this point on), on the data plane, as an IP router between WTRU2/WTRU3 and the UPDN domain/IP subnet(s). Client-server communication may now be enabled over the UPDN PDU session between WTRU2 (or WTRU3) and WTRU1, which may be composed of leg 1 between WTRU1 and UPF1, a leg1-leg2 connection (e.g., a tunnel) between UPF1 and UPF2, and leg 2 between UPF2 and WTRU2 (or WTRU3). In examples, the WTRU1 may send a message (e.g., a third message) to a network client (e.g., client WTRU, WTRU2, in-network SMF, etc.) via a data session (e.g., PDU session) established using the first network (e.g., UPDN). In examples, the WTRU1 may send a message (e.g., a third message) to a network client ((e.g., client WTRU, WTRU2, in-network SMF, etc.) via a data session (e.g., PDU session) established using the first network (e.g., UPDN) if the network client is authenticated.

The network (e.g., 5G network) operator may, in an alternative, associate a "connectivity DNN", e.g., DNN2, to a UPDN DNN1. The connectivity DNN may be used to enable establishing leg 1 and leg 2 of a PDU session targeting DNN1. In examples, SMF may identify a connectivity DNN2 associated with DNN1, and may use DNN2 in the message in 11-2. As a result, WTRU1 may establish leg 1 using DNN2 in the PDU session establishment request in 12b-2. DNN2 may identify a N-UPDN or a N-UPDN 5GLAN DN.

The roles of WTRU2/WTRU3 and WTRU1 (e.g., in FIGS. 18A-B) may be configured by network operators and/or mobile network customers using a "UPDN group", which may be provisioned to the provisioning procedure described in FIG. 12, e.g., using information elements in FIG. 10. In a UPDN group feature: There may be 2 classes of UPDN group members: UPDN providers (e.g., WTRU1) and UPDN consumers (e.g., WTRU2 and WTRU3). The network (e.g., 5G network) (e.g., AMF, SMF) may authorize UPDN activation for DNN1 from a UPDN provider member of a UPDN group associated with DNN1, e.g., using the procedure described herein in FIG. 6. The network (e.g., 5G network) (e.g., AMF, SMF) may authorize UPDN PDU session establishment requests with DNN1 from a UPDN consumer member of a UPDN group associated with DNN1, e.g., using the procedure described herein in FIGS. 18A-B. UPDN group provisioning may be based on the procedure described herein in FIG. 12. UPDN group provisioning may include an information element indicating if a 5GLAN member is a UPDN provider and/or a UPDN consumer. In examples, an "open" UPDN group may accept WTRU (e.g., all WTRUs) as a UPDN consumer by default, therefore enabling any WTRU (or possible any WTRU with a given level of service) to access the UPDN. A UPDN group may (e.g., may also) accept WTRUs as UPDN consumers based on authorization from an AAA server (e.g., provided by the 5G consumer and provisioned as described herein in FIG. 12).

One or more of the following may occur: USMF may provide a WTRU with an IPv4 and/or IPv6 address allocation and/or parameter configuration for the PDU session and/or a WTRU may forward towards UPDN the service request originated from a client WTRU application (e.g., as shown in FIG. 16).

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A first wireless transmit/receive unit (WTRU) for providing a network, the first WTRU comprising:
  a processor configured to:
    determine a first network to be registered, wherein the first network is provided by the first WTRU;
    send a first message to a network node, wherein the network node is associated with a second network, and wherein the first message indicates a network name associated with the first network, indicates that the first WTRU provides the first network, and indicates a request to register the first network with the second network;
    receive a second message from the network node, wherein the second message indicates the network name associated with the first network, and indicates that the first network has been registered with the second network; and
    send a session request message to a second WTRU via a data session, wherein the data session uses the network name associated with the first network.

2. The first WTRU of claim 1, wherein the first network is a user equipment provided data network (UPDN), wherein the network name is a domain network name (DNN), and wherein the data session is a protocol data unit (PDU) session.

3. The first WTRU of claim 1, wherein the session request message is sent based on network information associated with the first network satisfying one or more criteria.

4. The first WTRU of claim 3, wherein the network information associated with the first network satisfies the one or more criteria if it is determined that the second WTRU has a subscription associated with the first network.

5. The first WTRU of claim 1, wherein the processor is further configured to:
  send an authentication request to the network node if it is determined that the data session is to be established using the first network, wherein the authentication request indicates a request of an identity associated with the second WTRU to be authenticated.

6. The first WTRU of claim 1, wherein the session request message is a second session request message, and wherein the processor is further configured to:
  send a first session request message to the network node associated with the second network if a network information associated with the first network satisfies a criterion, wherein the first session request message indicates a request to establish the data session using the first network; and
  receive a session request response from the network node associated with the second network, wherein the session request response indicates that the first WTRU can establish the data session with the second WTRU using the first network.

7. The first WTRU of claim 1, wherein the session request message is a second session request message, and wherein the processor is further configured to:
  receive a third message from the second network, wherein the third message indicates an identity of the second WTRU and indicates the network name associated with the first network;
  send a first session request message to the network node associated with the second network, wherein the first session request message indicates a request to establish the data session with the second WTRU using the first network; and
  receive a session request response from the network node associated with the second network, wherein the session request response indicates that the first WTRU can establish the data session with the second WTRU using the first network.

8. The first WTRU of claim 1, wherein the first message further indicates UPDN-related information elements, and wherein the UPDN-related information elements comprise a list of DNNs, each DNN within the list of DNNs corresponding to a respective UPDN instance.

9. A method implemented within a first wireless transmit/receive unit (WTRU) for providing a network, the method comprising:
- determining a first network to be registered, wherein the first network is provided by the first WTRU;
- sending a first message to a network node, wherein the network node is associated with a second network, and wherein the first message indicates a network name associated with the first network, indicates that the first WTRU provides the first network, and indicates a request to register the first network with the second network;
- receiving a second message from the network node, wherein the second message indicates the network name associated with the first network, and indicates that the first network has been registered with the second network; and
- sending a session request message to a second WTRU via a data session, wherein the data session uses the network name associated with the first network.

10. The method of claim 9, wherein the first network is a user equipment provided data network (UPDN), wherein the network name is a domain network name (DNN), and wherein the data session is a protocol data unit (PDU) session.

11. The method of claim 9, wherein the session request message is sent based on network information associated with the first network satisfying one or more criteria.

12. The method of claim 11, wherein the network information associated with the first network satisfies the one or more criteria if it is determined that the second WTRU has a subscription associated with the first network.

13. The method of claim 9, further comprising:
- sending an authentication request to the network node if it is determined that the data session is to be established using the first network, wherein the authentication request indicates a request of an identity associated with the second WTRU to be authenticated.

14. The method of claim 9, wherein the session request message is a second session request message, further comprising:
- sending a first session request message to the network node associated with the second network if a network information associated with the first network satisfies a criterion, wherein the first session request message indicates a request to establish the data session using the first network; and
- receiving a session request response from the network node associated with the second network, wherein the session request response indicates that the first WTRU can establish the data session with the second WTRU using the first network.

15. The method of claim 9, wherein the session request message is a second session request message, further comprising:
- receiving a third message from the second network, wherein the third message indicates an identity of the second WTRU and indicates the network name associated with the first network;
- sending a first session request message to the network node associated with the second network, wherein the first session request message indicates a request to establish the data session with the second WTRU using the first network; and
- receiving a session request response from the network node associated with the second network, wherein the session request response indicates that the first WTRU can establish the data session with the second WTRU using the first network.

16. The method of claim 9, wherein the first message further indicates UPDN-related information elements, and wherein the UPDN-related information elements comprise a list of DNNs, each DNN within the list of DNNs corresponding to a respective UPDN instance.

\* \* \* \* \*